US012780332B2

(12) United States Patent
Loudon et al.

(10) Patent No.: US 12,780,332 B2
(45) Date of Patent: Nov. 3, 2026

(54) WIRE MANAGEMENT SYSTEM FOR TONNEAU COVER

(71) Applicant: WORKSPORT LTD., Richmond Hill (CA)

(72) Inventors: Jonathan Loudon, Toronto (CA); Jason Macdonald, Toronto (CA); Nathan Asis, Richmond Hill (CA); Steven Rossi, Vaughan (CA)

(73) Assignee: Worksport Ltd., Richmond Hill (CA)

( * ) Notice: Subject to any disclaimer, the term of this patent is extended or adjusted under 35 U.S.C. 154(b) by 336 days.

(21) Appl. No.: 18/710,941

(22) PCT Filed: Nov. 16, 2022

(86) PCT No.: PCT/US2022/050102
§ 371 (c)(1),
(2) Date: May 16, 2024

(87) PCT Pub. No.: WO2023/091483
PCT Pub. Date: May 25, 2023

(65) Prior Publication Data

US 2025/0026416 A1 Jan. 23, 2025

Related U.S. Application Data

(60) Provisional application No. 63/280,235, filed on Nov. 17, 2021.

(51) Int. Cl.
*B62D 33/04* (2006.01)
*B60R 16/02* (2006.01)

(52) U.S. Cl.
CPC .......... *B62D 33/04* (2013.01); *B60R 16/0215* (2013.01)

(58) Field of Classification Search
CPC ....... B62D 33/04; B60R 16/0215; B60J 7/141
See application file for complete search history.

(56) References Cited

U.S. PATENT DOCUMENTS 11,220,164 B2 * 1/2022 Rossi ........................ B08B 1/10
2008/0245405 A1 10/2008 Garvison et al.
2009/0320898 A1 12/2009 Gumm

FOREIGN PATENT DOCUMENTS

TW M416748 U * 11/2011
TW M416748 U1 11/2011

OTHER PUBLICATIONS

Examination Report No. 1 For Standard Patent Application, AU Patent Application No. 2022391641, dated Apr. 9, 2025, pp. 1-2.

(Continued)

*Primary Examiner* — Aaron L Lembo
(74) *Attorney, Agent, or Firm* — Bond, Schoeneck & King, PLLC

(57) ABSTRACT

A foldable panel assembly (e.g., foldable tonneau cover) having first and second panels, the second panel being rotatably attached to the first panel about an axis of rotation. A wire management system is provided including a junction box disposed with the first panel and having an electrical connector. An electrical wire is attached to the electrical connector and extends from the junction box over an interface between the first and second panels. In the extended position, the electrical wire has an amount of slack sufficient to allow the electrical wire to move relative to one or both panels. In the folded position, the amount of slack in the electrical wire is reduced relative to the extended position and the electrical wire is taut over the interface. This configuration permits the panels to be folded and unfolded without pinching or straining the electrical wire during said folding and unfolding.

20 Claims, 20 Drawing Sheets

(56) References Cited

OTHER PUBLICATIONS

First Office Action, CA Patent Application No. 3238986, dated Nov. 14, 2025, pp. 1-4.
Patent Examination Report 1, NZ Patent Application No. 810772, dated Oct. 28, 2025, pp. 1-2.
Patent Examination Report 2, NZ Patent Application No. 810772, dated Dec. 22, 2025, pp. 1-2.
International Search Report and the Written Opinion of the International Searching Authority, PCT Application No. PCT/US2022/050102, dated Feb. 8, 2023, pp. 1-6.

* cited by examiner

WIRE MANAGEMENT SYSTEM FOR TONNEAU COVER

BACKGROUND

1. Field of the Invention

The present invention generally relates to tonneau covers used in covering the cargo boxes of pickup trucks. More particular, the present invention relates to foldable tonneau covers including electrical components.

2. Description of Related Technology

An advantage of a pickup truck (hereafter just "truck") is the ability to haul or store cargo in the bed of the truck. The bed is located rearward of the passenger cabin or cab (hereafter "cab") and commonly includes a pair of opposed sidewalls joined at their forward and rearward ends by a front wall or bulkhead and rear wall or tailgate, respectively. One truck bed accessory that exists to cover the bed of the truck is commonly referred to as a tonneau cover. Tonneau covers are used to cover the cargo boxes or beds (hereafter just "beds") of pickup trucks for aesthetics, aerodynamics, and protection of any contents located in the bed from ejection and from environmental factors, such as rain, dirt, snow, and debris.

While various styles of tonneau covers exist, one of the most popular styles is a foldable tonneau cover. A foldable tonneau cover is desirable because, when not required to cover the bed of the pickup truck, the tonneau cover may be folded toward the rear of the cab of the truck, leaving at least a portion of the bed open and uncovered.

Foldable tonneau covers themselves come in soft fold tonneau covers and hard fold tonneau covers. Soft fold tonneau covers employ a foldable frame having typically three or more sections defined by side frame members and transverse frame members, the latter of which extend between the side frame members. Additional transverse members, sometimes referred to as cross bows, may be provided between the transverse frame members. The sections of the frame are connected by hinge systems that allow the sections to fold relative to one another. A cover or tarp of a flexible material is retained over the entire foldable frame. Alternatively, hard fold tonneau covers include three of more rigid panels or sections connected by hinges, where the rigid panels can be folded atop one another from the tailgate toward the cab of the truck.

When being folded, generally, the rearmost panel or section of the hard or soft foldable tonneau cover is folded forward, toward the passenger cabin or cab, on top of the next rearmost panel or section of the tonneau cover. These two panels or sections are then together folded forward onto the next rearmost panel or section of the tonneau cover. This folding procedure is continued until all panels or sections of the tonneau cover are folded, one on top of one another, forming a stack of tonneau cover panels or sections adjacent to the cab of the pickup truck. In this stack, the panel or section of the tonneau cover located closest to the cab ultimately forms the bottom of the stack. A representative construction of a soft fold tonneau cover is disclosed in U.S. Pat. No. 10,399,420. A representative construction of a hard fold tonneau cover is disclosed in U.S. Pat. No. 10,596,887.

Thus, when folded into a stack, soft fold tonneau covers and hard fold tonneau covers (hereafter collectively "foldable tonneau covers") provide access to or uncover a portion of the bed, while still covering another portion. Some foldable tonneau covers are capable of further folding beyond the folded position to an upright or vertical position relative to the truck bed, such that a top surface of the stack is adjacent the rear of the cab of the truck, to provide a larger open or uncovered portion of the bed.

Foldable tonneau covers may be equipped with electrical components. For example, one or more panels of a tonneau cover may include a light system mounted to panel. Alternatively, one or more of the panels may include a solar panel on a top surface to capture solar energy and power the vehicle or various accessories or to charge the battery/ies of the vehicle.

The tonneau cover panels having electrical components disposed at the panels may be electrically connected to one another via electrical wires or cables. For example, a tonneau cover may have three or more panels and each panel may have an electrical device disposed thereon and wired in series with a power source or a battery. When connecting the individual panels of the tonneau cover to one another via the electrical cables, the cables must pass over or otherwise traverse the hinged interface between the individual panels. During folding and unfolding of the tonneau cover, the cables may be overly stretched and strained or twisted and pinched. Additionally, when unfolded, the cables may hang from the undersurface of the panel into the cargo box of the truck where they may interfere with or be damaged by cargo in the bed of the truck.

As seen from the above discussion, foldable tonneau covers that include electrical components provide advantages, but may easily have the cables associated therewith damaged during folding and unfolding. A means of managing electrical wires or cables connecting tonneau cover panels without damaging the cables or obstructing the cargo space of the truck bed is not known to exist.

SUMMARY

In one aspect described herein, a foldable panel assembly is disclosed. The foldable panel assembly may include first and second panels with the second panel being located adjacent to the first panel and being rotatably attached to the first panel along an interface therebetween for rotational movement about an axis of rotation. As such, the foldable panel assembly has an extended position and a folded position, the folded position being the first panel rotated to stack onto the second panel. A wire management system is provided which may include a junction box disposed with the first panel and having an electrical connector, an electrical wire, the electrical wire being attached to the electrical connector of the junction box and extending from the junction box over the interface and to the second panel. In the extended position, the electrical wire has an amount of slack sufficient to allow the electrical wire to move relative to one of the first and second panels. In the folded position, the amount of slack in the electrical wire is reduced relative to the extended position and the electrical wire is taut over the interface relative to the extended position. Thus, the first and second panels may be folded onto one another and unfolded relative to one another without pinching or straining of the electrical wire during said folding and unfolding.

In another aspect, the electrical wire may be retained adjacent to the first and second panels for movement along the first and/or second panel.

In a further aspect, the electrical wire may be retained along an exterior surface of the first and second panels for movement along the exterior surface.

In an additional aspect, the electrical wire may be retained within a channel provided in the first panel and/or the second panel for movement within the channel.

In yet another aspect, a portion of the electrical wire may be fixedly retained.

In still a further aspect, the electrical wire may be fixedly retained to one of the first and second panels and moveable relative to the of the first and second panels.

In an additional aspect, the electrical wire may be fixedly retained adjacent to the interface between the first and second panels.

In another aspect, the electrical wire may be fixedly retained to a hinge mechanism provided between the first and second panel.

In yet a further aspect, the hinge mechanism may be a double hinge mechanism having a spacer between the first and second panels, the electrical wire being fixedly retained to the spacer.

In an additional aspect, the electrical wire may extend from the junction box in a direction generally parallel to the rotational axis and extends over the interface between the first and second panels in a direction substantially perpendicular to the rotational axis.

In still another aspect, the electrical wire may defines a first radius of curvature when the tonneau cover is in the folded position and a second radius of curvature when the tonneau cover is in the extended position, the second radius of curvature being different from the first radius of curvature.

In a further aspect, the second radius of curvature may be smaller than the first radius of curvature.

In an additional aspect, a cover may be provided over the junction box, the electrical wire, or both.

In another aspect, a channel may be defined within at least one of the first and second panels for movement within the channel, and the electrical wire may be retained within the channel with the cover extending over the channel and the electrical wire.

In a further aspect, the panel assembly may be incorporated into a tonneau cover configured to extend over a bed of a pickup truck and is moveable between the folded position and the extended position.

In an additional aspect, an end of the electrical wire opposite from the attachment to the electrical connector may be electrically connected to an electrical component.

In still another aspect, 17, the electrical component may be a solar panel disposed on or along an exposed surface of the tonneau cover.

In yet a further aspect, a clamp may secure the electrical wire against an exterior surface of the first and/or second panel.

In an additional aspect, the clamp may include a base plate and a clamping portion disposed in overlying relation to the base plate, wherein the base plate and clamping portion may define a channel through which the electrical wire is positioned.

In another aspect described herein, a method of manufacturing the tonneau cover is described. The method may include the steps of securing a junction box to a surface of a tonneau cover, connecting an electrical wire to the junction box via an electrical connector, and retaining the electrical wire on a surface of the tonneau cover with an amount of slack sufficient to allow the electrical wire to move relative to one of first and second panels of the tonneau cover.

Further objects, features and advantages of this invention will become readily apparent to persons skilled in the art after review of the following description, including the claims, and with reference to the drawings that are appended to and form a part of this specification

DETAILED DESCRIPTION

Figure 1:
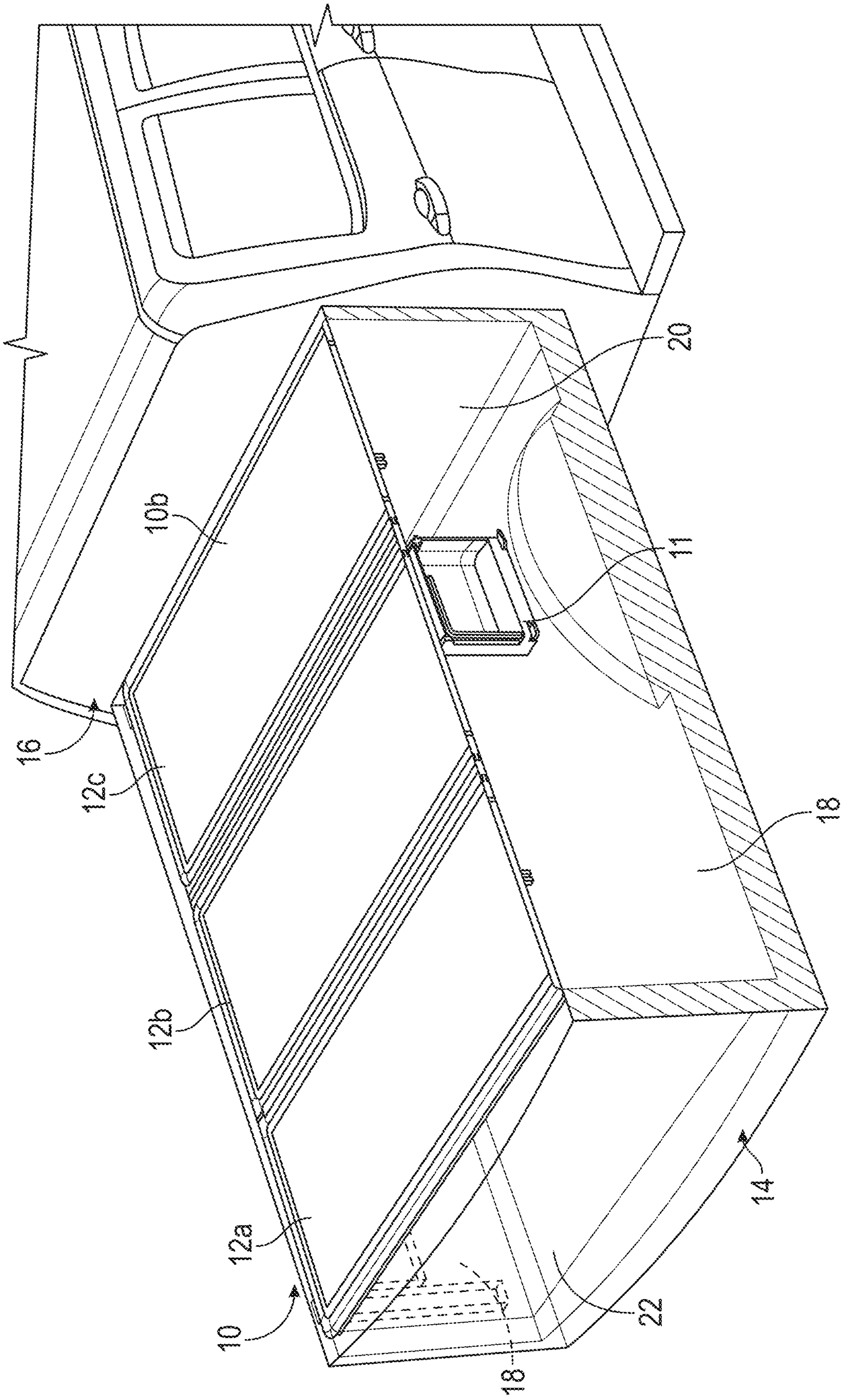
FIG. 1 is a perspective view of a bed of a pickup truck with a tonneau cover in an extended position and covering the bed.

Referring now to the drawings, a foldable tonneau cover attached to a truck bed is generally illustrated in FIG. 1 and designated at 10. The foldable tonneau cover 10 is shown as being mounted to the bed 14 of a pickup truck 16 so as to cover or enclose the bed 14. The bed 14 is located rearward of the passenger cabin or cab (hereafter "cab") and includes a pair of opposed sidewalls 18 joined at their forward and reward ends by a front wall or bulkhead 20 and rear wall or tailgate 22, respectively. The tops of the sidewalls are typically reinforced and define bed rails. The foldable tonneau cover 10 may be mounted to or rest upon the bed rails. The foldable tonneau cover 10 is shown in an extended position where the individual panels 12 of the tonneau cover 10 are adjacent one another and cover the bed 14. The tonneau cover 10 is foldable from the extended position to a folded position, where the panels 12 are folded relative to one another toward the cab or bulkhead 20 to uncover at least a portion of the bed 14.

Each panel 12 of the foldable tonneau cover 10 includes an electrical component 24, such as a solar panel, and a junction box 26. The junction boxes 26 on the panels of the foldable tonneau cover 10 are connected via a system of electrical wires or cables 28 that pass between the individual panels and traverse the hinged interfaces between adjacent panels. As will be discussed in detail below, the foldable tonneau cover 10 incorporating the principles of the present invention is equipped with a wire management system 30 that allows the electrical wires or cables 28 to traverse the interfaces between panels 12 and that allows the panels to be foldable relative to one another without risk of damaging the cables 28 or obstructing cargo space of the bed 14. For example, the disclosed wire management system 30 prevents the wires or cables 28 from hanging down from a bottom or undersurface 10*a* of the tonneau cover 10 into the bed 14 and prevents the cables 28 from stretching, kinking, breaking, or otherwise being damaged when the tonneau cover transitions from the extended position to the folded position.

As previously mentioned, foldable tonneau covers themselves come in variety of different styles, such as soft fold tonneau covers and hard fold tonneau covers. As described herein, the invention is not limited to an embodiment of a specific style of foldable tonneau cover. Accordingly, as described below, a reference to foldable tonneau cover 10 is generic to all types of foldable tonneau covers, unless the language or context of the description specifically requires a different interpretation or the description otherwise indicates to the contrary. Additionally, although described herein as being equipped with solar panels, it should be understood that the panels of the tonneau cover may be equipped with electrical components 24 that are not solar panels, such as a lighting system, and that the invention described herein is not limited to the application of solar panels disposed at the tonneau cover unless specifically claimed.

As illustrated in FIG. 1, the foldable tonneau cover 10 is mounted to the bed 14 of a pickup truck 16 and includes a plurality of sections or panels 12. As illustrated therein, the foldable tonneau cover 10 has three tonneau panels 12, and with the tonneau cover 10 in the extended or unfolded state so as to cover the bed 14, panel 12*a* is located closest or adjacent to the tailgate 22, section 12*c* is located closest or adjacent to the bulkhead 20, and panel 12*b* is located between and adjacent both panel 12*a* and panel 12*c*. Panel 12*a* may be referred to herein as the rear or tailgate panel 12*a*, panel 12*b* may be referred to herein as the middle panel 12*b*, and panel 12*c* may be referred to herein as the front or bulkhead panel 12*c*. Each panel 12 of the foldable tonneau cover 10 may be equipped with a solar panel 24 at a top surface 10*b* of the respective panel so that when the tonneau cover 10 is extended over the bed 14, the solar panels 24 are disposed exteriorly of the bed 14 to capture solar energy and power one or more vehicular accessories or charge a battery 11 disposed at the vehicle.

Figure 2:
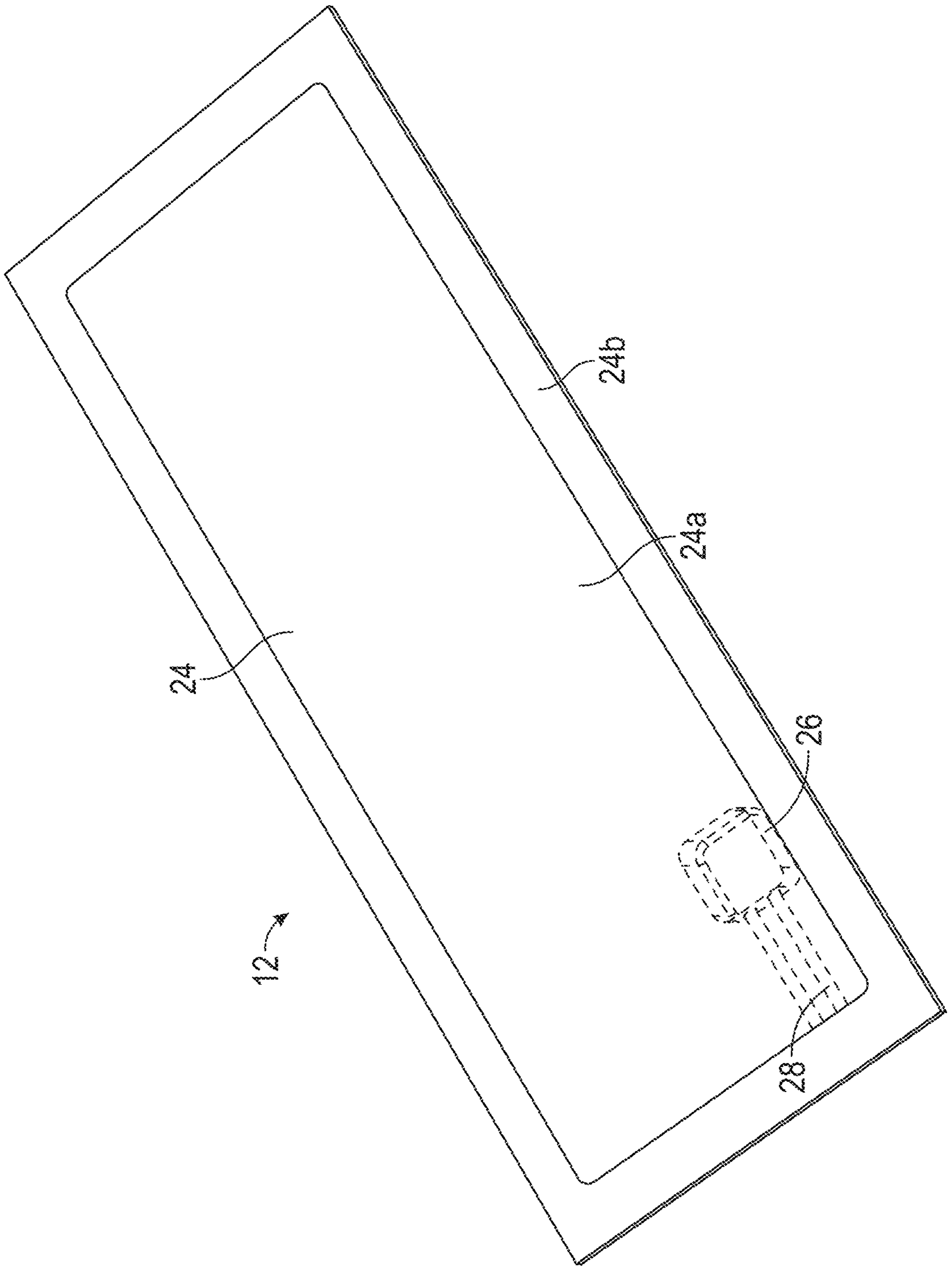
FIG. 2 is a perspective view of a section of the tonneau cover including a solar panel.

FIG. 2 depicts a single tonneau cover panel 12 that is representative of the panels 12*a*-12*c*. The panel 12 includes the electrical component 24, for example described hereafter as a solar panel 24, disposed or exposed on the top surface of the panel 12 to capture solar energy. The solar panel 24 may include a plurality of photovoltaic areas or cells 24*a* disposed on a substrate layer 24*b* and beneath a transparent protective layer (not shown) that protects the photovoltaic area 24*a* from the environment while allowing light to pass through the protective layer. The solar panel 24 may be mounted to the top surface of the panel 12 (i.e., the top surface 10*b* of the tonneau cover 10) or the solar panel 24 may be integrally formed with the panel 12 to form at least a portion of the top surface 10*b* of the panel 12. A junction box 26, for providing an electrical connection to the solar panel 24, is disposed at or on a bottom surface of the solar panel 24 and exposed at the undersurface 10*a* of the tonneau cover 10, so that, with the tonneau cover 10 in the extended position, the junction box 26 is generally facing into the bed 14. The junction box 26 electrically connects through the panel 12 to the solar panel 24 and connects the solar panel 24 with cables 28 (e.g., so the cables 28 may carry current to or from the electrical component 24).

Figure 3:
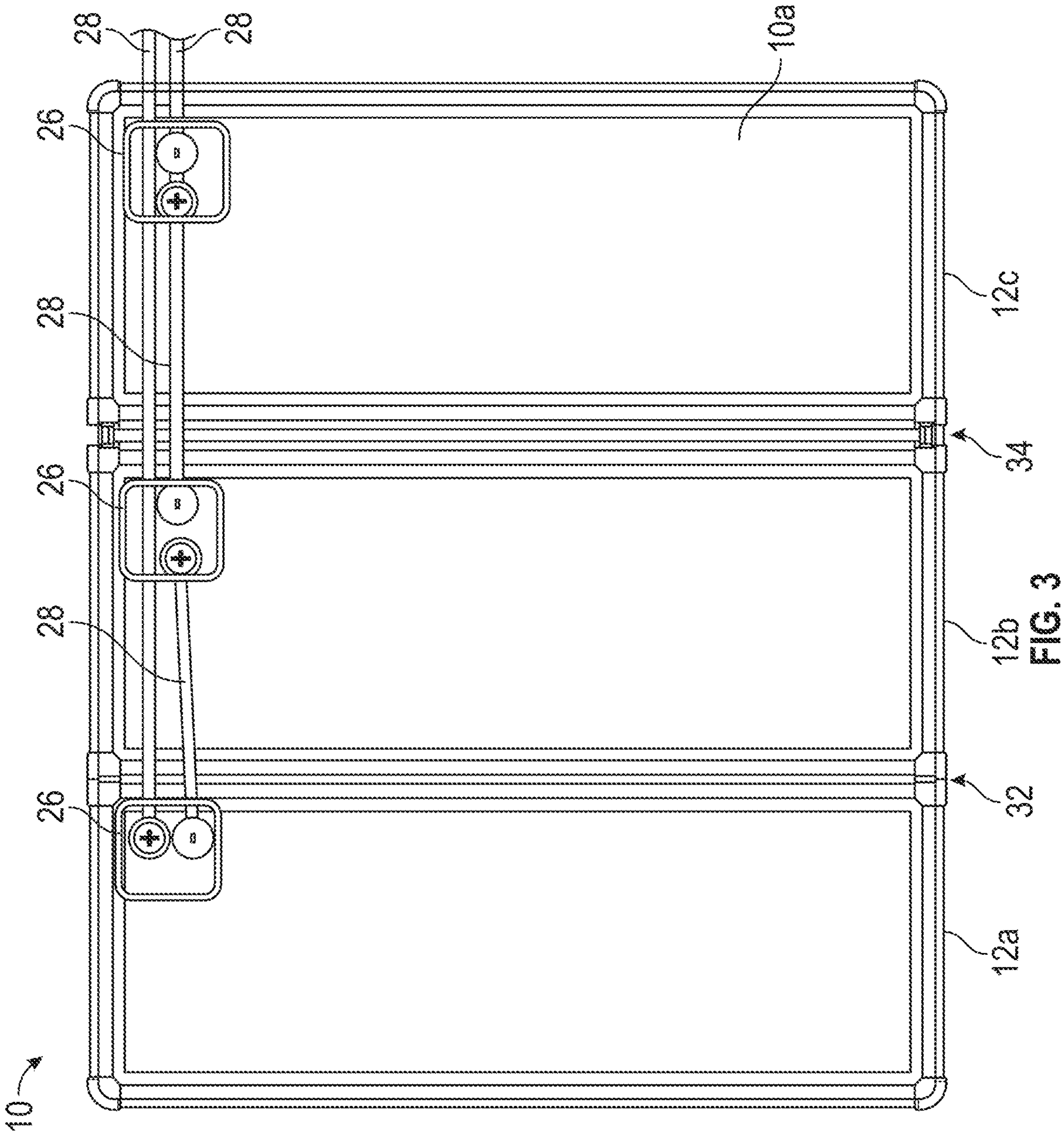
FIG. 3 is a plan view of the tonneau cover with solar panels disposed on each panel of the tonneau cover and schematically showing the electrical connections between each of the panels.

FIG. 3 schematically depicts an exemplary wiring system for a tonneau cover 10 having three panels 12 and an electrical component 24 disposed at each panel 12. As shown, each panel 12 includes a solar panel 24 (as the electrical component 24) disposed at a top surface of the respective panel 12 and a junction box 26 disposed at a bottom or undersurface of the respective panel 12, the junction boxes each having a positive and a negative connection. The solar panels 24 are wired in series. Thus, a cable 28 electrically connects to the positive connection of the junction box 26 of the solar panel 24 at the tailgate panel 12*a* and passes along the undersurface 10*a* of the tonneau cover 10 over the middle panel 12*b* and toward the bulkhead panel 12*c*. Separate cables 28 also connect between the negative connection of the junction box 26 of the solar panel 24 at the tailgate panel 12*a* and the positive connection of the junction box 26 of the solar panel 24 at the middle panel 12*b*. An additional separate cable 28 connects between the negative connection of the junction box 26 of the solar panel 24 at the middle panel 12*b* and the positive connector of the junction box 26 of the solar panel 24 at the bulkhead panel 12*c*. The cable 28 connected to the positive connector of the junction box 26 of the solar panel 24 at the tailgate panel 12*a* and the cable connected to the negative connector of the junction box 26 of the solar panel 24 at the bulkhead panel 12*c* both electrically connect to the other electrical component (e.g., vehicle accessory or battery). Thus, one or more cables 28 will traverse the interface between the tailgate panel 12*a* and the middle panel 12*b* and one or more cables 28 will traverse the interface between the middle panel 12*b* and the bulkhead panel 12*c*.

As seen in FIG. 3, the tailgate panel 12*a* is pivotally attached to the middle panel 12*b* via a single hinge mechanism 32 (i.e., a hinge or flexible substrate) at adjacent edges of the tailgate panel 12*a* and the middle panel 12*b* to allow the panels to pivot relative to one another along the adjacent edges. When the tailgate panel 12*a* is moved toward the folded position, the tailgate panel 12*a* is folded about the single hinge mechanism 32, so that the top surface of the tailgate panel 12*a* is adjacent the top surface of the middle panel 12*b*. The single hinge mechanism 32 thus provides the interface between the tailgate panel 12*a* and the middle panel 12*b* that cables 28 must pass or traverse to electrically connect the solar panels 24 at the respective panels. When the tailgate panel 12*a* is moved toward the extended position, the tailgate panel 12*a* is unfolded about the single hinge mechanism 32, so that the top surface of the tailgate panel 12*a* is substantially aligned and coplanar with the top surface of the middle panel 12*b*. In other words, there should be approximately a 180-degree angle between the tailgate panel 12*a* and the middle panel 12*b*, and neither the tailgate panel 12*a* nor the middle panel 12*b* should be able to pivot beyond the approximate 180-degree angle therebetween.

As also seen in FIG. 3, the middle panel 12*b* is also pivotally attached to the bulkhead panel 12*c* at an edge opposite the edge at which the middle panel 12*b* is pivotally attached to the tailgate panel 12*a*. The middle panel is pivotally attached to the bulkhead panel 12*c* via a double hinge mechanism 34 at adjacent edges of the middle panel 12*b* and the bulkhead panel 12*c*. When the tonneau cover is further moved to the folded position, the tailgate panel 12*a* and the middle panel 12*b*, together, are folded relative to the bulkhead panel 12*c* so that the top surface of the tailgate panel 12*a* remains adjacent the top surface of the middle panel 12*b* and the bottom surface of the tailgate panel 12*a* is thereafter adjacent the top surface of the bulkhead panel 12*c*. When the middle panel 12*b* is moved toward the extended position, the middle panel 12*b* is unfolded about the double hinge mechanism 34, so that the top surface of the middle panel 12*b* is substantially aligned and coplanar with the top surface of the bulkhead panel 12*c*. In other words, there should be approximately a 180-degree angle between the middle panel 12*b* and the bulkhead panel 12*c*, and neither the middle panel 12*b* nor the bulkhead panel 12*c* should be able to pivot beyond the approximate 180-degree angle therebetween.

Figure 4:
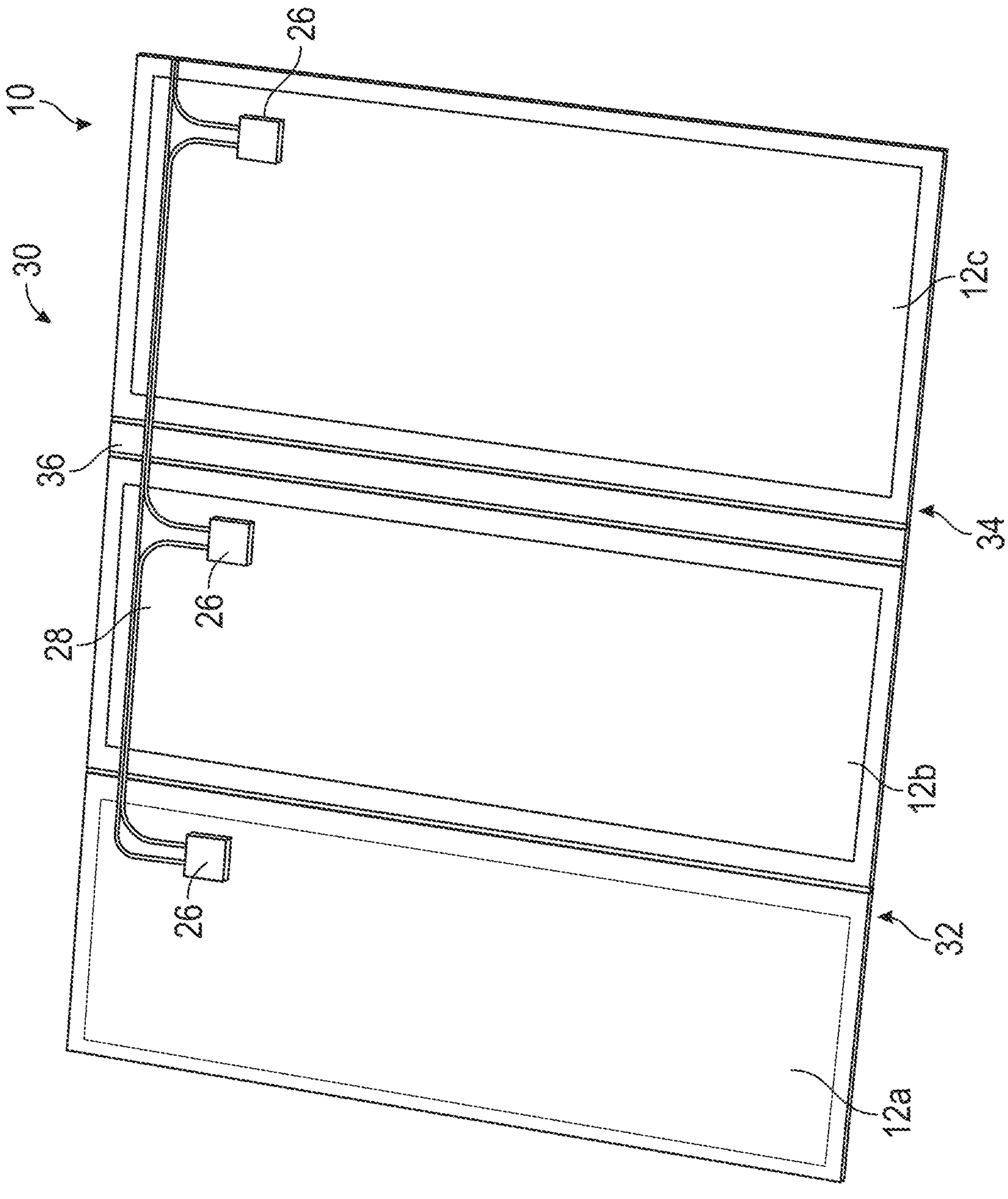
FIG. 4 illustrates a tonneau cover having a wire management system according to certain embodiments of the present invention.

To account for the increased thickness resulting from the tailgate panel 12*a* now being disposed between the middle panel 12*b* and the bulkhead panel 12*c*, the double hinge mechanism 34 includes a spacer 36, which is readily seen in FIG. 4. Thus, the middle panel 12*b* is pivotally attached to an edge of the spacer 36 (e.g., via a hinge or flexible substrate) along the edge of the middle panel 12*b* that is opposite from the edge or side of the middle panel 12*b* pivotally attached to the tailgate panel 12*a*. The opposing edge of the spacer 36 is pivotally attached to the bulkhead panel 12*c* (e.g., via a hinge or flexible substrate). The double hinge mechanism 34 thus provides the interface between the middle panel 12*b* and the bulkhead panel 12*c* that cables 28 must pass or traverse to electrically connect the solar panels 24 at the respective panels.

Cables 28 extend from the respective junction boxes 26 and along the bottom or undersurface 10*a* of the tonneau cover 10 and traverse the interface at the single hinge mechanism 32 and the interface at the double hinge mechanism 34. As mentioned above, the wire management system 30 is configured to allow the cables 28 to pass along the bottom or undersurface of the tonneau cover 10 and traverse the interfaces of the tonneau cover 10 while precluding damage to the cables when the tonneau cover 10 is folded and/or unfolded. The cables 28 traverse the interfaces between the panels 12 along an outer surface of the panels 12 to preclude the cables 28 from being broken, pinched, or otherwise damaged during folding and unfolding of the tonneau cover 10. For example, where a cable extends between panels of the tonneau cover through portions of a hinge mechanism and the cable is provided with sufficient slack to transverse the folded hinge mechanism without being stressed, the cable is susceptible to damage via pinching when the tonneau cover 10 is unfolded.

Positioning the cables 28 along an outer surface of the tonneau cover 10 helps to prevent the cables 28 from being pinched between the edges of panels 12 when unfolded. However, when the tonneau cover 10 is folded and unfolded, the cables 28 at the outer surface of the tonneau cover are pulled and pushed relative to fixed junction boxes 26 due to the separation of the panels 12 at the interfaces. When the panels 12 of the tonneau cover 10 are folded relative to one another, a given cable 28 connecting adjacent junction boxes 26 must traverse a greater distance than when the panels 12 are unfolded. In other words, when the tonneau cover 10 is in the extended position, the cable 28 connecting the junction box 26 of the tailgate panel 12*a* with the junction box 26 of the middle panel 12*b* only traverse the distance between the junction boxes 26. But with the tonneau cover 10 in the folded position, the cable 28 must traverse not only that distance, but also the additional distance defined by the thickness of the panels 12 at the folded interface. Thus, the length of the cables 28 must account for the distance between the junction boxes 26 plus the combined thicknesses of the panels 12 when the tonneau cover 10 is in the folded position.

As can be understood by one of skill in the art, a cable traverses the interface between the panels in the extended position, but due to the slack in the cable accounting for the thickness of the tonneau cover in the folded position, the cables extend away from the surface of the panel and would hang down from the tonneau cover, potentially interfering with or obstructing the cargo in the bed of the truck. This problem is only exacerbated at the double hinge interface. With the tonneau cover in the folded position, the cable is tightly stretched over the interface and is pulled taut over the edges of the panels, which may be relatively sharp. The cables are thus susceptible to damage or obstructing the cargo area of the bed in such a system.

Figure 5:
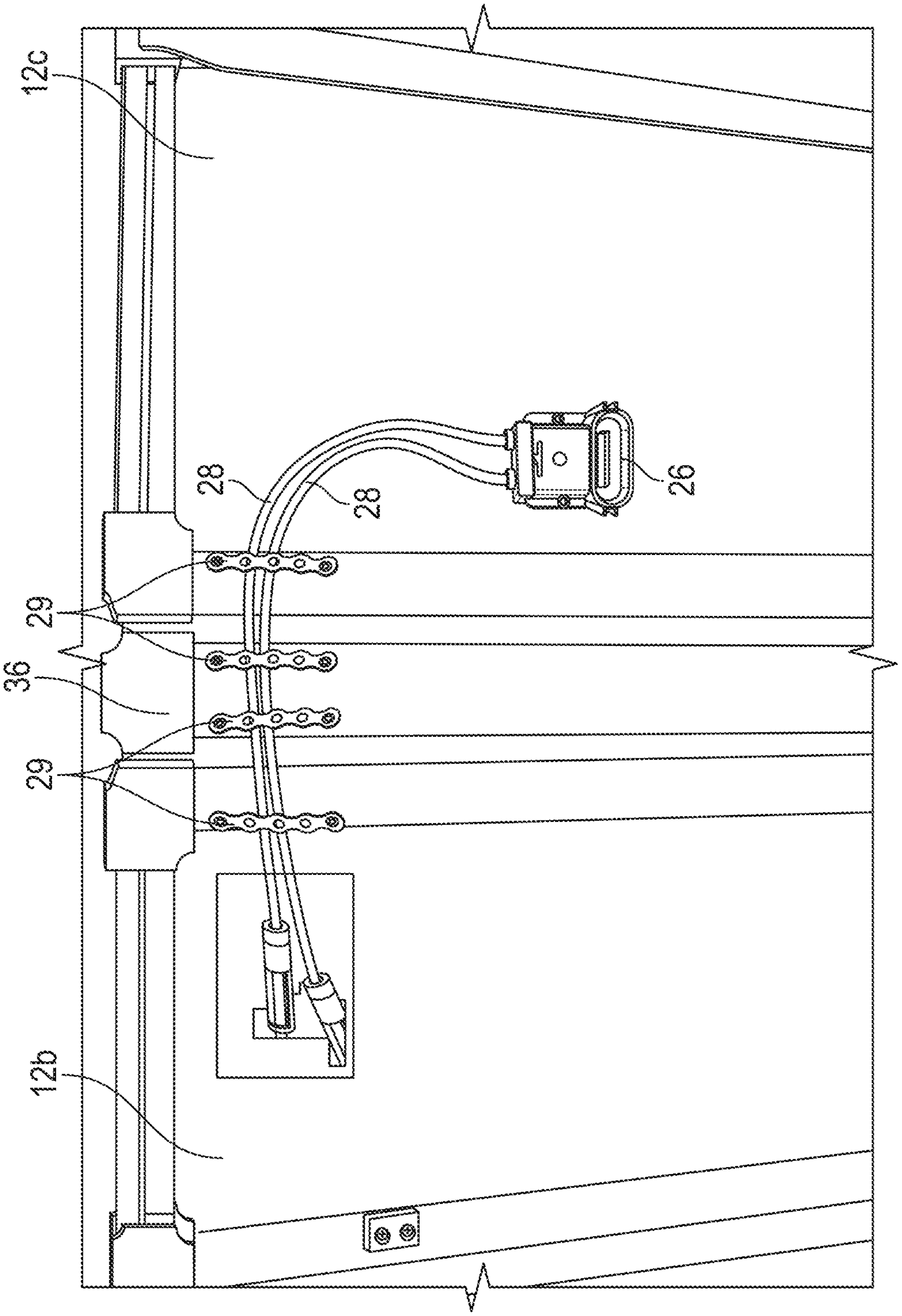
FIG. 5 depicts a portion of an exemplary tonneau cover incorporating an exemplary wire management system according to the present disclosure.
Figure 6B:
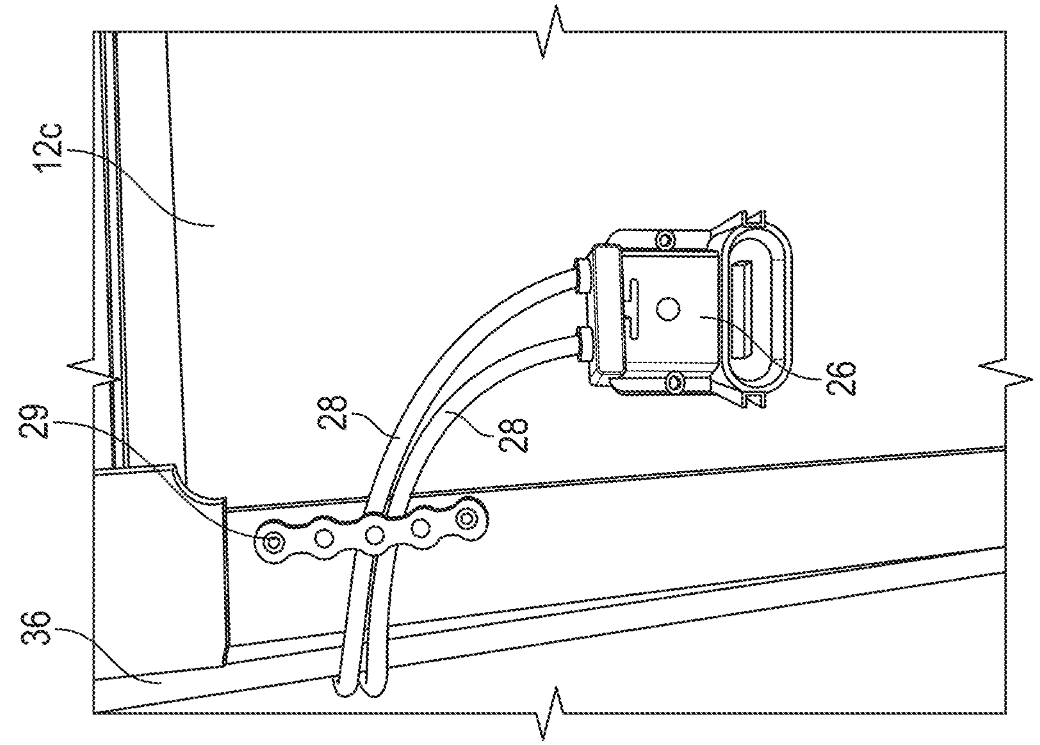
FIG. 6B is an enlarged view of the tonneau cover of FIG. 5, depicting a state of the electrical cables with the panels of the tonneau cover in a folded position.
Figure 6A:
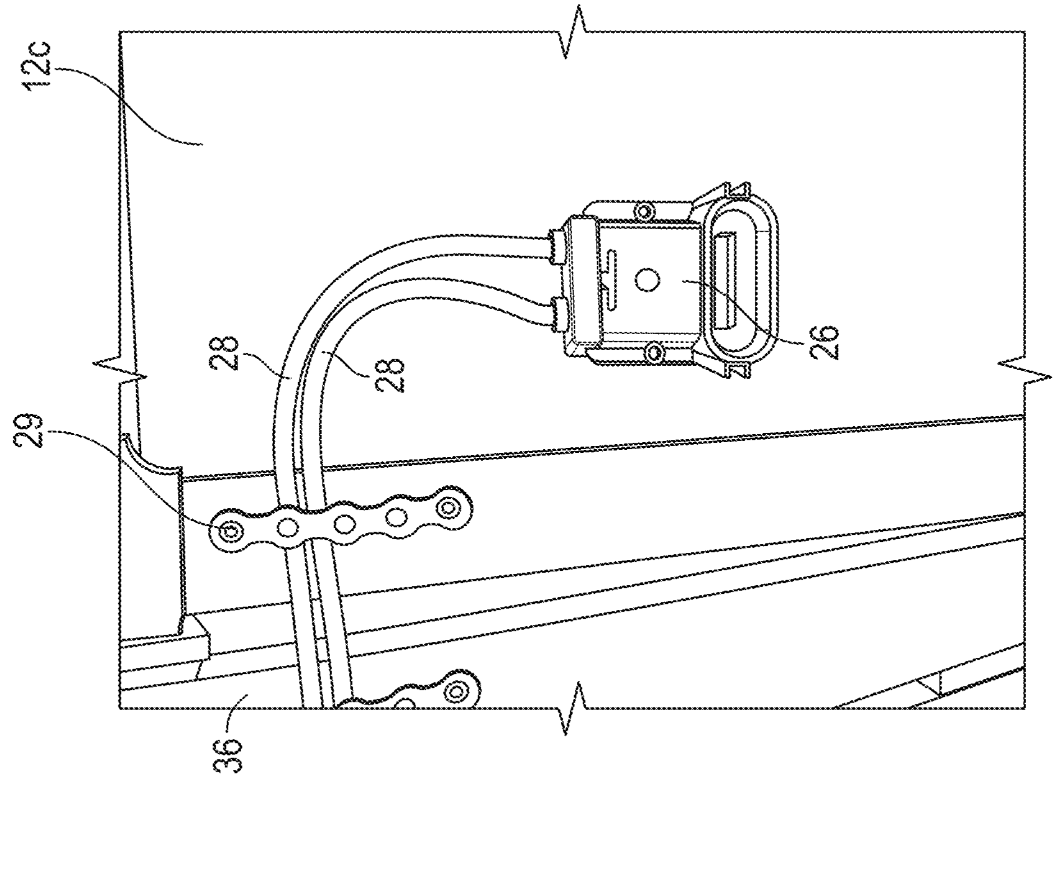
FIG. 6A is an enlarged view of the tonneau cover of FIG. 5, depicting a state of the electrical cables with the panels of the tonneau cover in an extended, non-folded position.

FIG. 5 depicts a tonneau cover 10 equipped with a cable management system 30, according to certain embodiments of the current invention. The junction boxes 26 are designed or oriented so that the cables 28 extend from the respective junction boxes 26 in a direction that is substantially parallel to the interfaces/pivot axes between the adjacent panels 12 of the tonneau cover 10. Thereafter, the cables 28 bend or curve toward the interfaces to traverse the interface at a substantially 90-degree angle relative thereto. The radii of curvature provided in the cable is selected to impart a length to the cable 28 that accounts for the folding and unfolding of the panels 12 relative to one another (i.e., to account for the thicknesses of the panels when in the folded position). Thus, when the panels 12 fold and unfold relative to one another, the initial radius of curvature provides a slack in the respective cables 28 that allows them to be flexed along the surface of the tonneau cover 10 rather than pinching and/or drooping from the surface of the tonneau cover 10 into the cargo area of the bed 14. For example, FIGS. 5, 6A, and 6B depict junction boxes 26 at adjacent panels 12 and cables 28 traversing a double hinge interface between two adjacent panels 12. FIGS. 5 and 6A depict the cables 28 with the tonneau cover 10 in an extended state, so that the slack in the cables 28 is flexed along the surface of the panel 12 (and not drooping substantially into the cargo area of the bed 14), thereby establishing a smaller radius of curvature in the cables 28 relative to the folded position. FIG. 6B depicts the cables 28 with the panels 12 of the tonneau cover 10 in a folded state. As seen therein, the slack in the cables 28 has been removed to accommodate the expanded interface between the adjacent panels 12. As a result, a larger radius of curvature in the cables 28 (relative to the extended position) is seen. The cables 28 may slidably pass through simple straps, brackets, guides, or other structures 29 at or near the edges of the panels 12 along the interface to help retain and guide the cables 28 along the surface of the panels 12.

Figure 7:
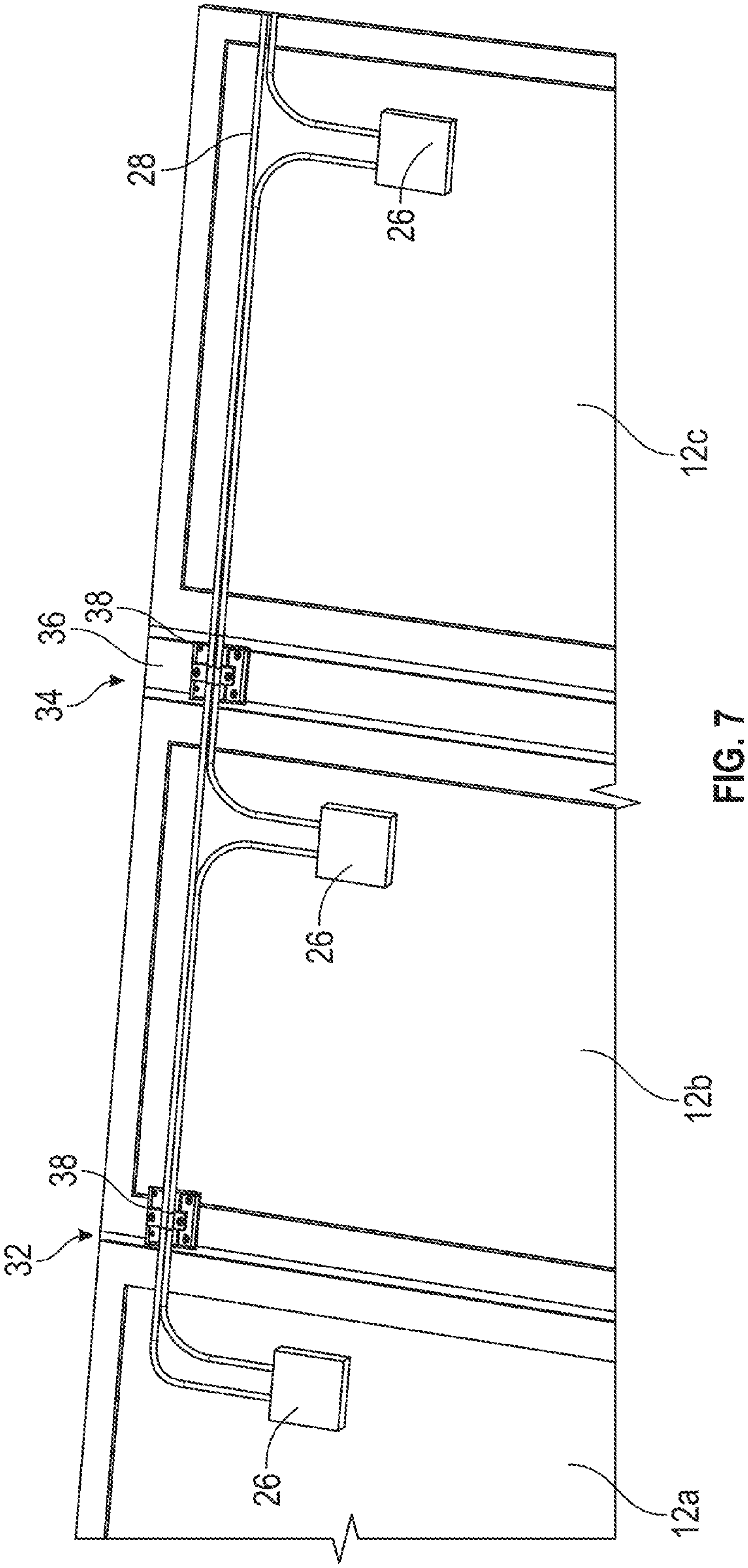
FIG. 7 is a partial view of the tonneau cover of FIG. 4, additionally showing the electrical cables fixedly mounted via wire clamps.
Figure 8:
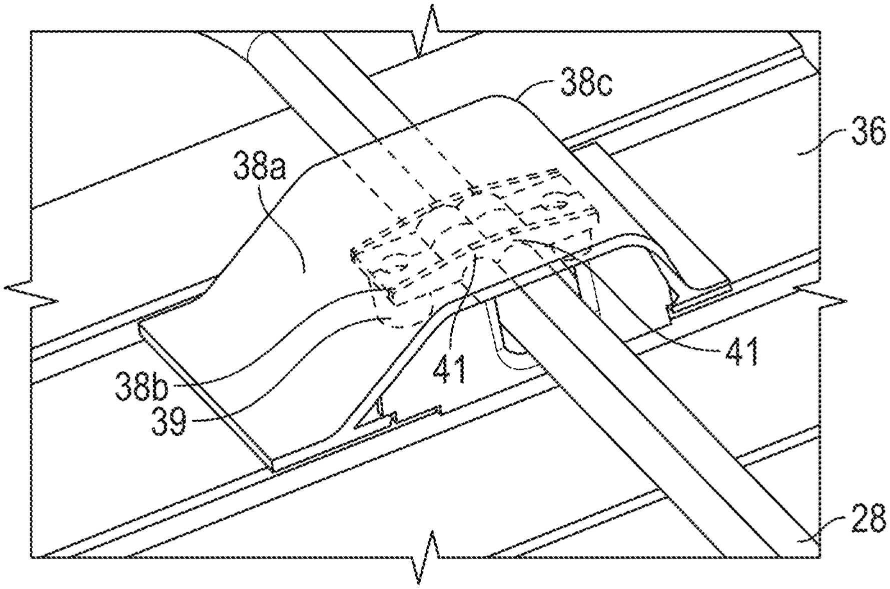
FIGS. 8 and 9 are enlarged perspective views of the tonneau cover of FIG. 7, and showing a cover mounted over the wire clamps.
Figure 9:
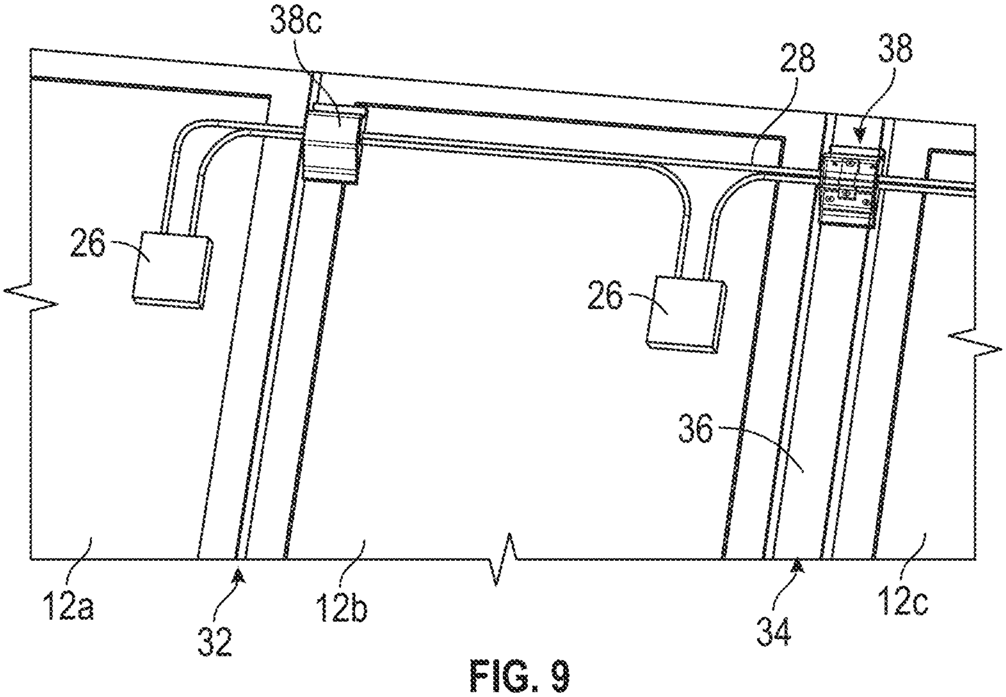

As shown in FIGS. 7-9, exemplary embodiments of the cable management system 30 may include alternative constructions to retain the cables 28, including wire clamps 38 that fix the cables 28 relative to a position on the tonneau cover 10, so that the length of cable between a wire clamp 38 and a junction box 26 remains constant. Thus, the cable 28 may be held tightly on one side of an interface between adjacent panels and the cable may float loosely along the surface of the panel on the opposite side of the interface. Fixation of the cables 28 in this manner allows the cables 28 to controllably flex relative to the junction box 26. For example, one wire clamp 38 may be positioned at the edge of the middle panel 12*b* that is adjacent the tailgate panel 12*a* and a second wire clamp 38 may be positioned on the spacer 36 of the double hinge mechanism 34. Thus, the length of cable 28 disposed between the junction box 26 of the tailgate panel 12*a* and the wire clamp 38 on the middle panel 12*b* remains constant, as does the length of the cables 28 between the junction boxes 26 of the middle and bulkhead panels 12*b*, 12*c* and the wire clamp 38 on the spacer 36. The respective portions of the cables 28 have a set amount of slack and controllably float along the surfaces of the tailgate panel 12*a*, the middle panel 12*b*, and the bulkhead panel 12*c* as a result of being secured at the respective wire clamps 38.

The wire clamp 38 may include a base plate 38*a* (seen in FIG. 10) and a clamping piece or portion 38*b* (seen in FIG. 8) that is attached to the base plate 38 via screws or other fasteners. The base plate 38*a* may be integrally formed with the panel 12 or spacer 36 or may attach thereto in any suitable manner, such as via screws or other fasteners, adhesive such as double-sided tape, or clipped or snap attached to the panel 12 or spacer 36. A cover 38*c* may further attach to the base plate 38*a* and/or clamping portion 38*b* (such as via snap attachment or screws or other suitable fasteners) to provide a smooth outer surface at the bottom surface 10*a* of the tonneau cover 10.

Figure 10:
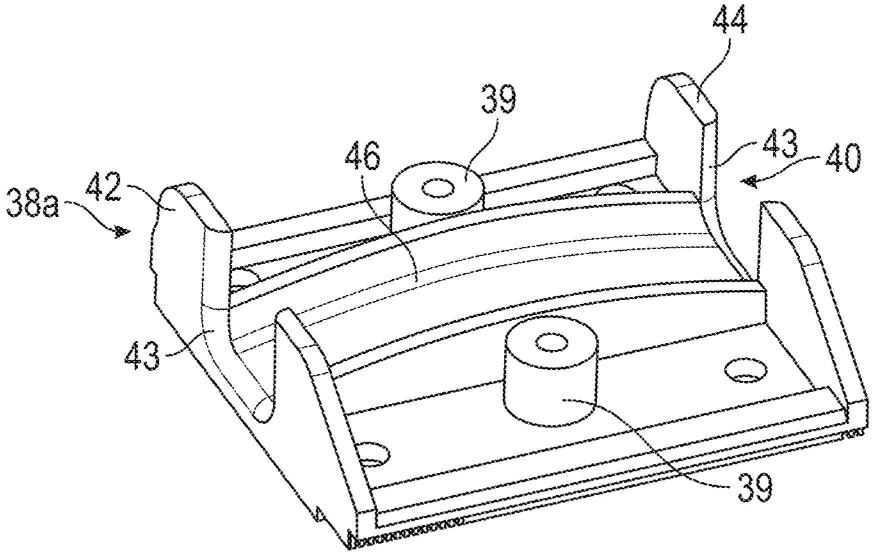
FIG. 10 is a perspective view of the base plate of the wire clamp.

As shown, the base plate 38*a* defines a channel that receives the cables 28, and the clamping portion 38*b* attaches at the base plate 38*a* securing the cables 28 between the clamping portion 38*b* and the base plate 38*a*. The clamping portion 38*b* extends laterally across the cables 28 and may include contoured portions 41 (seen in FIG. 8) corresponding to and configured to receive the cables 28 therein and provide secure retention of the cables 28. As shown in FIG. 10, the base plate 38*a* includes the channel 40 that receives the cables 28 therethrough. The channel 40 extends from a first end wall 42 on one side of the base plate 38*a* to a second end wall 44 on the opposing side of the base plate 38*b* and defines a passageway 46 to receive the cables 28 between the first side wall 42 and the second side wall 44. The passageway 46 may include a bowed floor having a convex profile between the end walls 42, 44 that can operate to relieve strain on the cables 28 at the transitions when the tonneau cover 10 is folded, reducing, or minimizing sharp corners or edges at the transitions. U-shaped apertures 43 are formed in the respective first and second end walls 42, 44 so that the cables 28 may readily pass therethrough and along the passageway 46 of the base plate 38*a*. The clamping portion 38*b* is received onto the base plate 38*a* to sandwich and secure the cables 28 between the clamping portion 38*b* and the base plate 38*a*. Bosses 39 may be provided on the base plate 38*a* to receive fasteners extended through apertures in the clamping portion 38*b*. A cap or cover 38*c* is preferably attached at the base plate 38*a* and defines the top surface of the apertures 41 (i.e., to provide atop surface over the U-shaped recesses) to enclose the cables 28 within the wire clamp 38.

Figure 11:
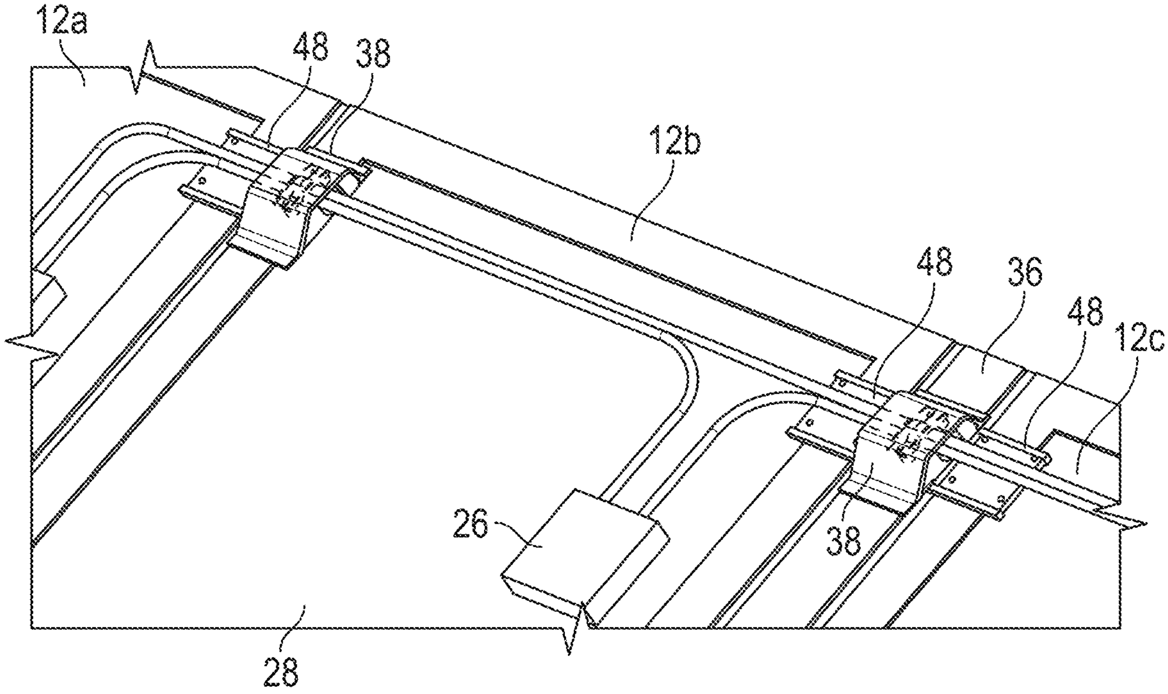
FIG. 11 is an enlarged partial view of the tonneau cover of FIGS. 8 and 9, showing slide plates, adjacent to the wire clamps, attached at the tonneau cover.

Furthermore, and as shown in FIG. 11, a skid or slide plate 48 may be attached (via screws, fasteners, or adhesives) at the respective interfaces of the panels 12 of the tonneau cover 10 to facilitate controlled movement of the cables 28 along the surface of panels, and the slide plate 48 itself, as the panels are folded relative to one another. A slide plate 48 is disposed on the tailgate panel 12*a* at the edge of the tailgate panel 12*a* adjacent the middle panel 12*b* so that the cables 28 may pass from the wire clamp 38, across the interface, and over and along the slide plate 48. A slide plate 48 is also disposed on both sides of the spacer 36, adjacent to the wire clamp 38 along the edge of the middle panel 12*b* and along the edge of the bulkhead panel 12*c*.

Figure 12:
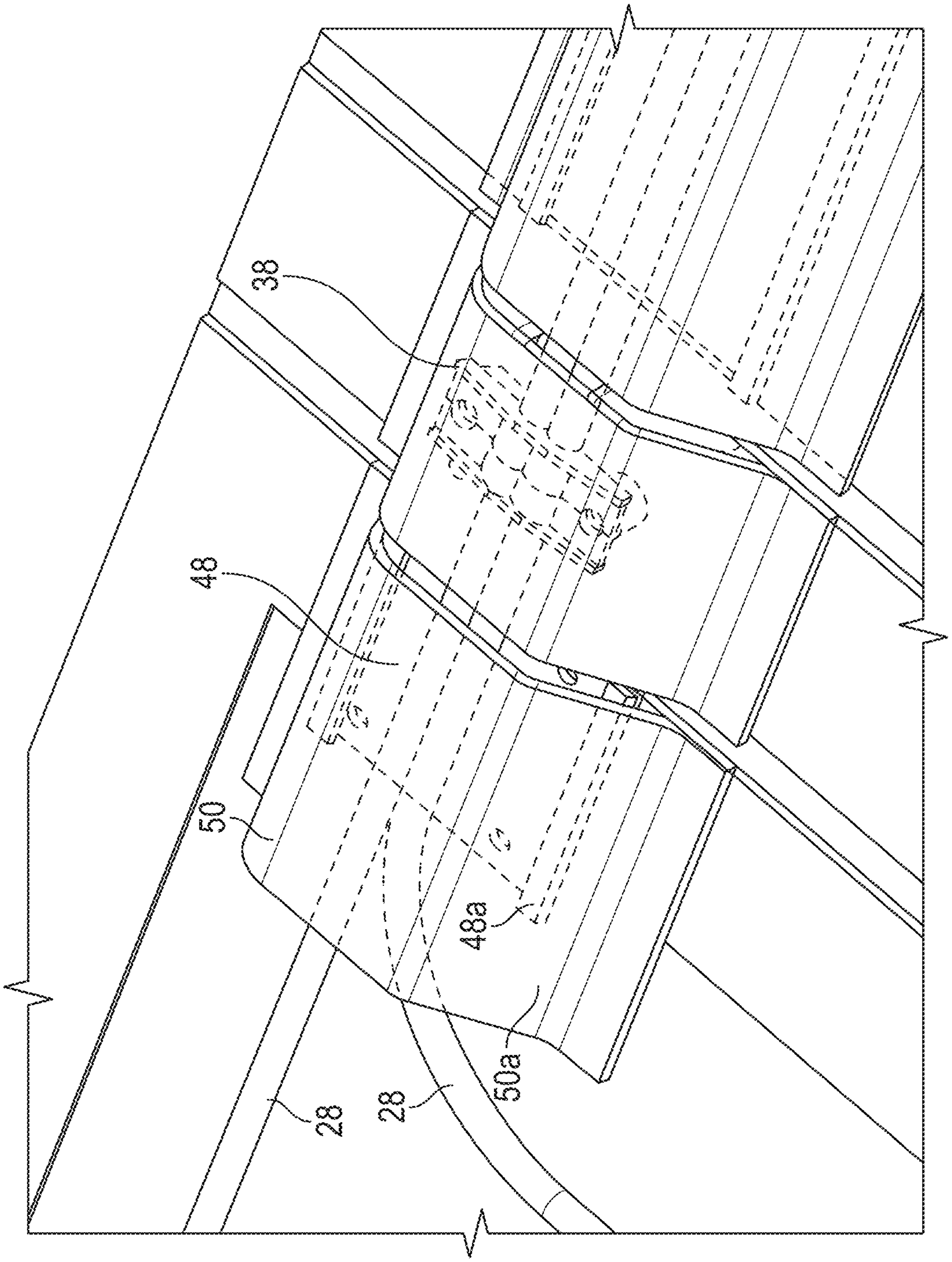
FIG. 12 is an enlarged partial view of the tonneau cover of FIG. 11, showing covers attached to the slide plates.

The slide plate 48 may also include a mechanism for attachment of a cap or cover 50, as shown in FIG. 12. As such, the cover 50 may attach at the slide plate 48 via a snap-fit engagement, sliding engagement, mechanical fasteners such as screws, adhesive or other means. As shown, for example, the slide plate 48 may include rails 48*a* at lateral edges of the slide plate 48, and the cover 50 may include corresponding flanges 50*a* that define a channel and receive the rails 48*a* of the slide plate 48 thereby retaining the cover 50 on the slide plate 48 in either a snap-fit engagement or sliding engagement. The slide plate 48 and cover 50 thus cooperate to guide the cables 28 adjacent to the wire clamp 38 and allow the cables 28 to freely slide and/or flex within the space defined between the slide plate 48 and the cover 50.

Figure 13:
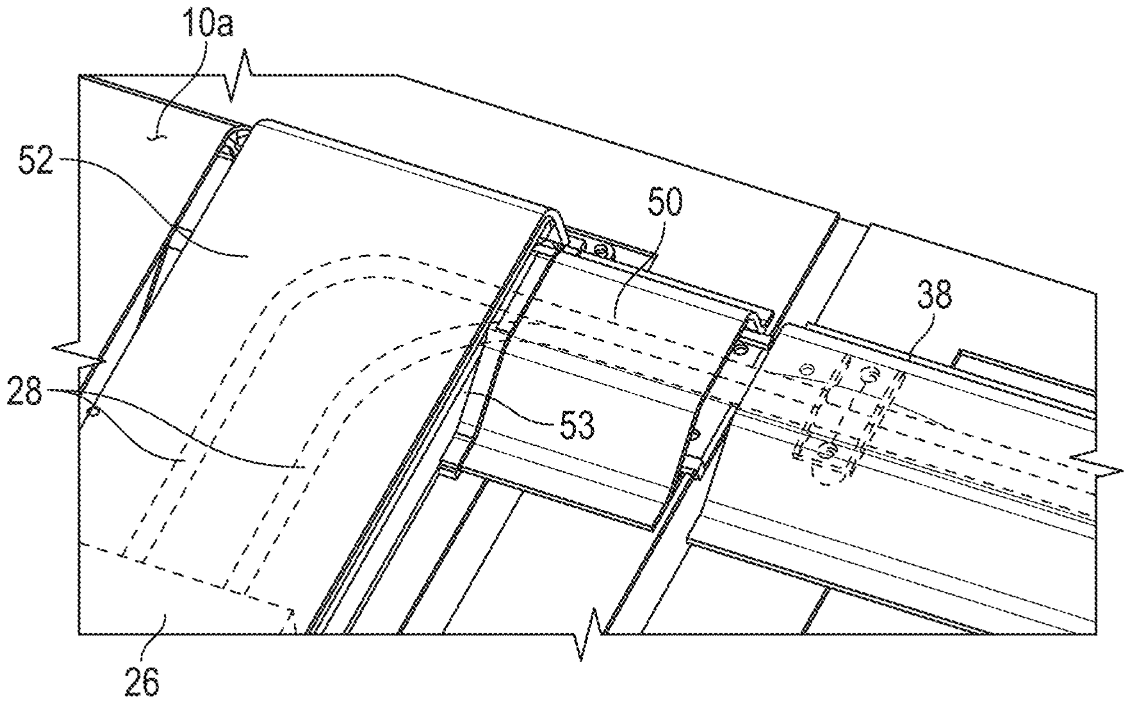
FIGS. 13 and 14 are enlarged partial views of the tonneau cover of FIG. 11, showing covers attached over the junction boxes and portions of the electrical cables extending from the junction boxes.
Figure 14:
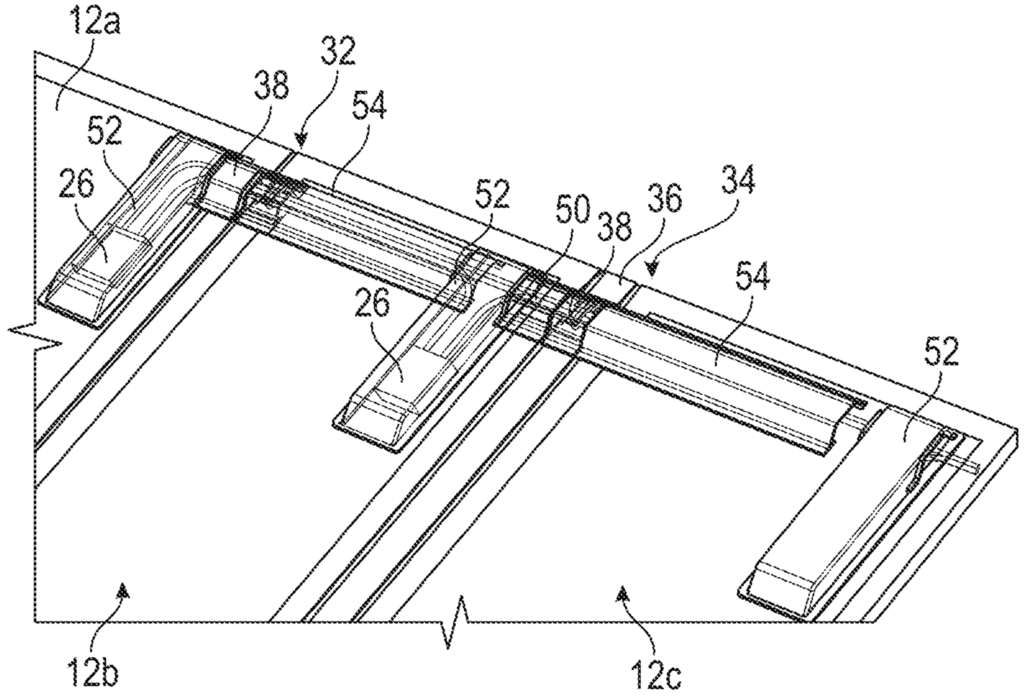

Additionally, other covers 52 may attach to the tonneau cover panel 12 and to the junction boxes 26, and overlap the slide plate covers 50, to cover the remaining portions of the cables 28 extending from the junction boxes 26 to the wire clamps 38. As shown in FIGS. 13 and 14, the covers 52 may attach at the bottom surface 10*a* of the tonneau cover 10 via screws and be configured to fully extend over the junction boxes 26, a portion of the slide plate covers 50 and the portions of the cables 28 extending therebetween. The cover 52 may include a cutout 53 shaped to correspond to the outer surface shape of the slide cover 50 so as to provide continuous coverage of the cables 28 therein. It will be appreciated that the cover 52 provides enough space and/or clearance to allow the cables 28 to flex and move along the surface of the tonneau cover 10 as the tonneau cover 10 is folded. As seen in FIGS. 13 and 14, additional covers 54 may extend between the wire clamps 38 and the slide covers 52 so that virtually no portions of the cables 28 are exposed to the cargo area of the truck bed 14. In the instance where the wire clamp 38 is mounted to the middle panel 12*b*, the cover 54 itself may receive and cover the wire clamp 38, or the cover 54 may abut a separate cover located over the wire clamp 38 as previously discussed. As provided, the cables 28 are retained between the bottom surface 10*a* of the tonneau cover and the covers 50, 52, 54 of the wire management system 30 and secured in discrete locations via the wire clamps 38.

Figure 15:
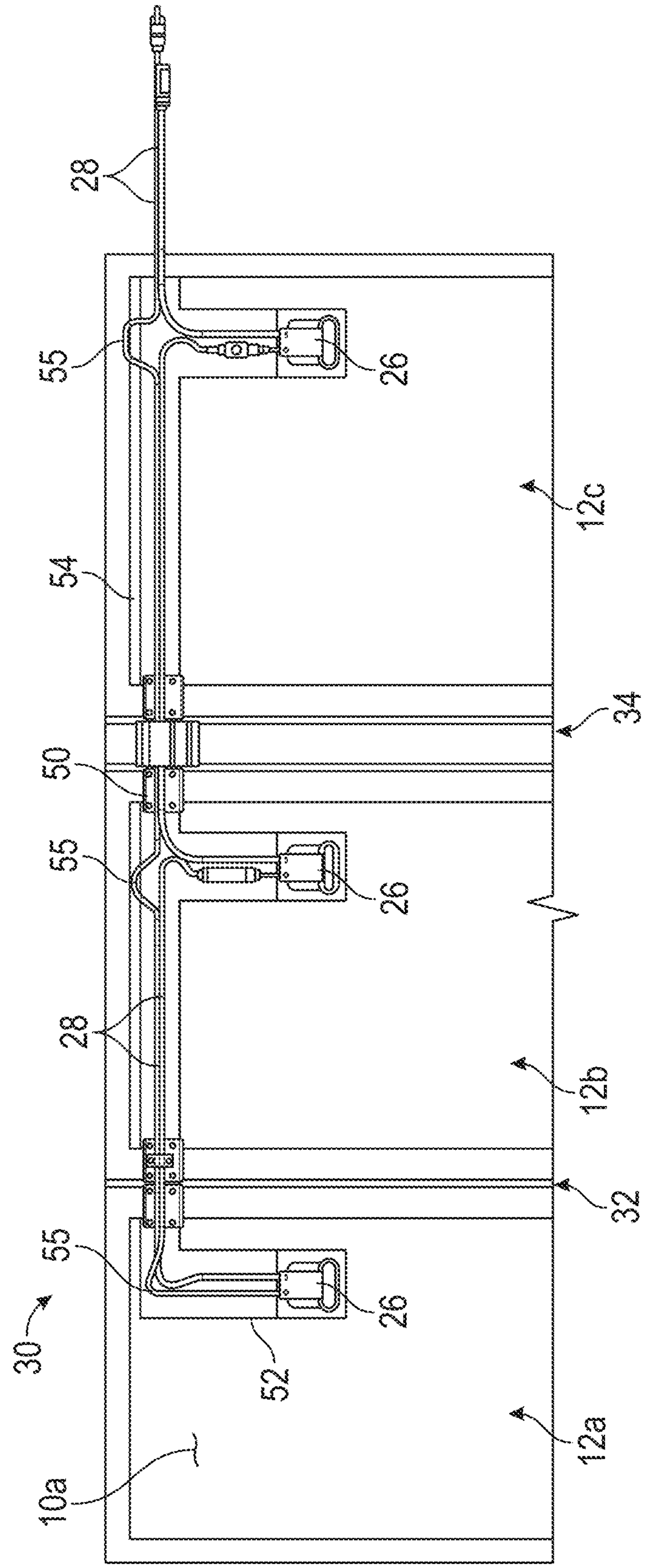
FIG. 15 is a partial plan view of a tonneau cover incorporating an exemplary embodiment of a wire management system, showing the fixed slack of the electrical cables when the tonneau cover in the extended, non-folded position.
Figure 16:
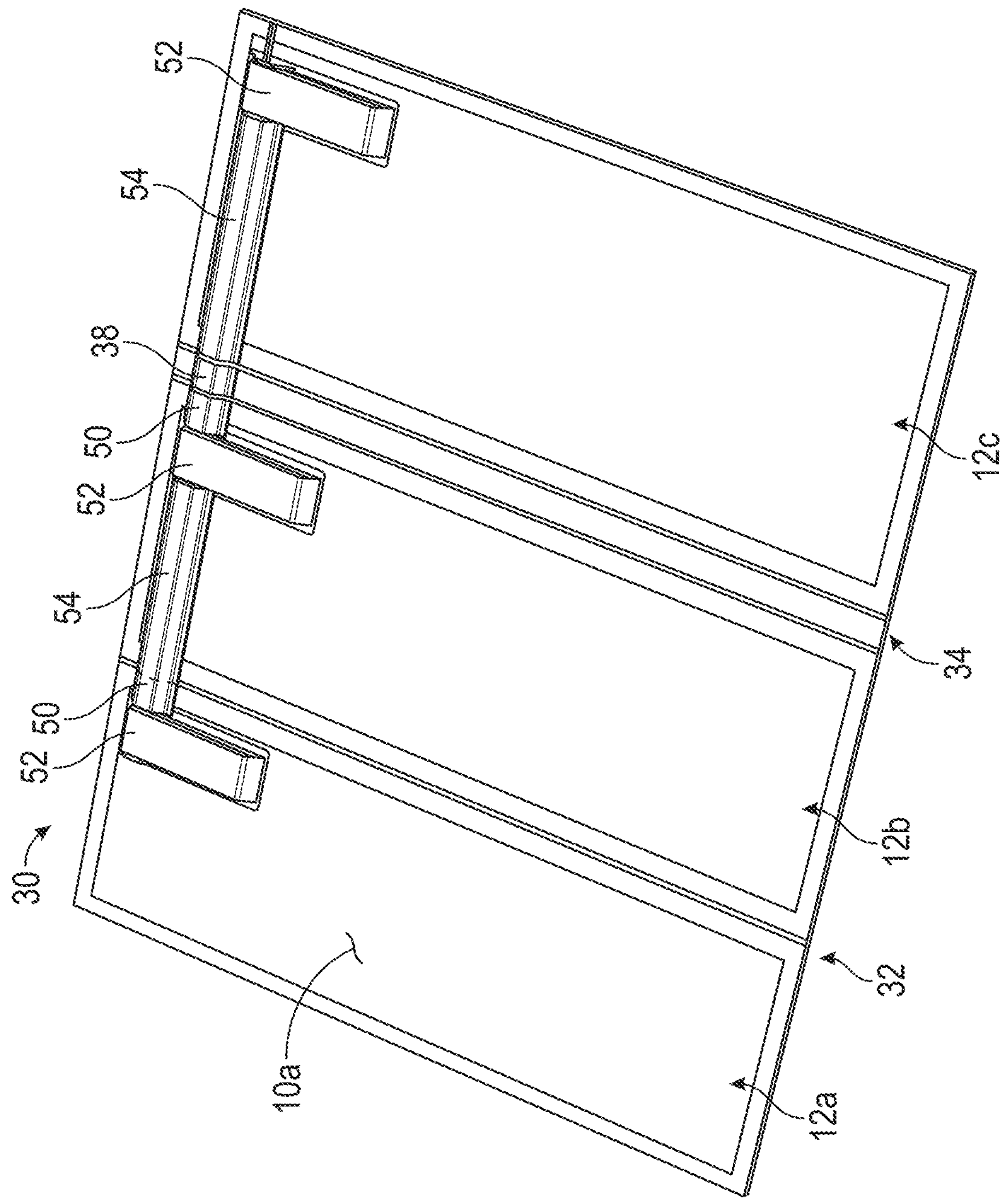
FIG. 16 is a perspective view of a tonneau cover of FIG. 15 showing the wire management system with a full complement of covers attached thereto.

FIG. 15 depicts a plan view of a tonneau cover 10 and an exemplary embodiment of a cable management system 30, with the covers 50, 52, 54 removed to illustrate the predetermined slack provided in the cables 28, which shown as a bent or flexed portion 55 of the cables 28, when the tonneau cover 10 is in the extended position. As previously noted, the predetermined slack operates to prevent excessive strain or stress on the cables 28 when the tonneau cover 10 is folded. FIG. 16 depicts the tonneau cover 10 as described above, with the covers 50, 52, 54 in place over the cables.

Figure 17:
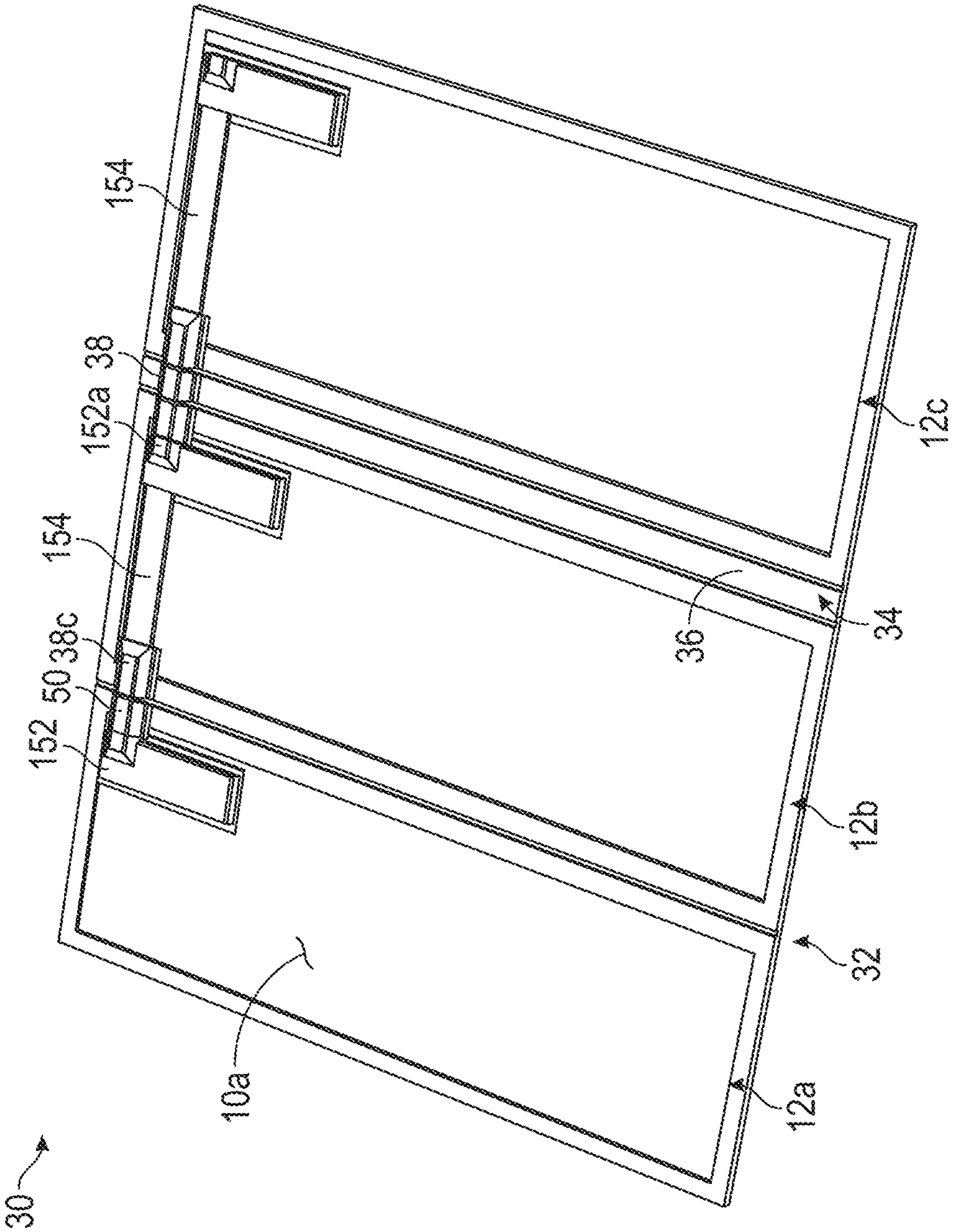
FIGS. 17 and 18 are perspective views of an exemplary embodiment of a tonneau cover incorporating a wire management system and having electrical cables disposed at least partially within channels provided within the panels of the tonneau cover.
Figure 18:
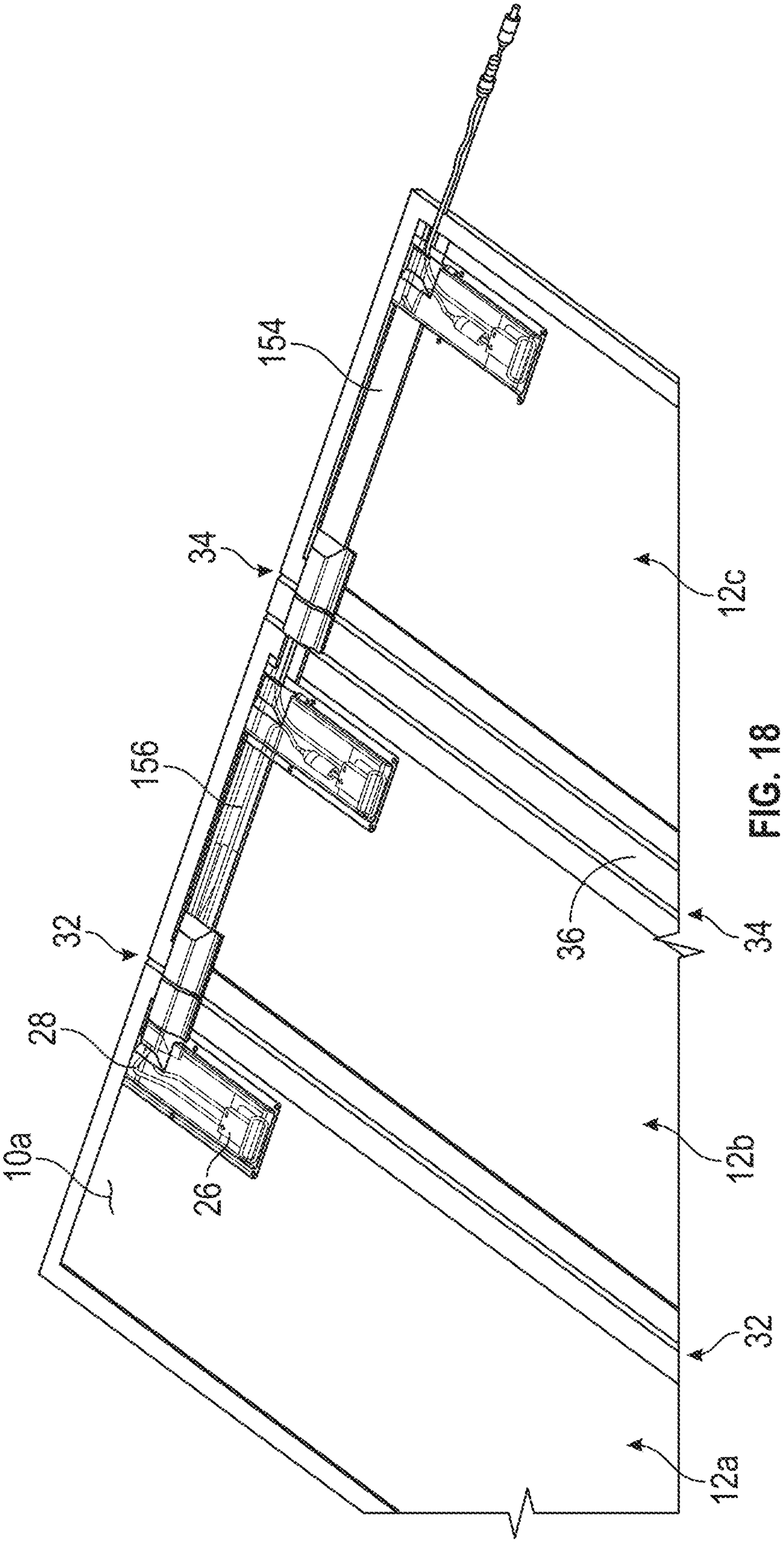

In another embodiment, and as shown in FIGS. 17 and 18, at least a portion of the cable management system 30 may also be configured to be inlaid, disposed within, or integrated with the body of the panels 12 of the tonneau cover 10. Thus, the cable management system 30 may provide a substantially slimmer or reduced profile over a portion of the bottom surface 10*a* of the tonneau cover 10 to further reduce any obstruction or protrusion into the bed 14. In the illustrated example, the junction boxes 26 are disposed in recesses provided in the bottom surfaces 10*a* of the panels 12 of the tonneau cover 10. Covers 152 disposed over the junction boxes 26 may therefore be provided a slimmer or flush profile with the bottom surface 10*a* of the tonneau cover 10 as compared to the raised covers 52 of the prior embodiment. Furthermore, the cables 28 traversing the panels 12 between the wire clamps 38 and the junction boxes 26 may thus be inlaid or integrated within the body of the panels 12, within recesses or channels 156 (seen in FIG. 19) provided in the panels 12. A cover 154 over these cables 28 may therefore be flush with the bottom surface 10*a* of the tonneau cover 10. The cover 38*c* of the wire clamp 38 may provide a curved, sloped, or tapered profile at one end to guide the cables 28 into the channels 156. Because the cables 28 traverse the interface between the panels 12 at an outer surface of the panels 12, the wire clamps 38 may be disposed on the panels 12 as described above, and the slide plates 48 and covers 150 may configured to guide the cables 28 into the recessed portions of the panel 12 beneath covers 152, 154. As such, the covers 152 may include an otherwise raised portion 152*a* (see FIG. 20) corresponding to the cover 150 of the slide plate 48.

Figure 19:
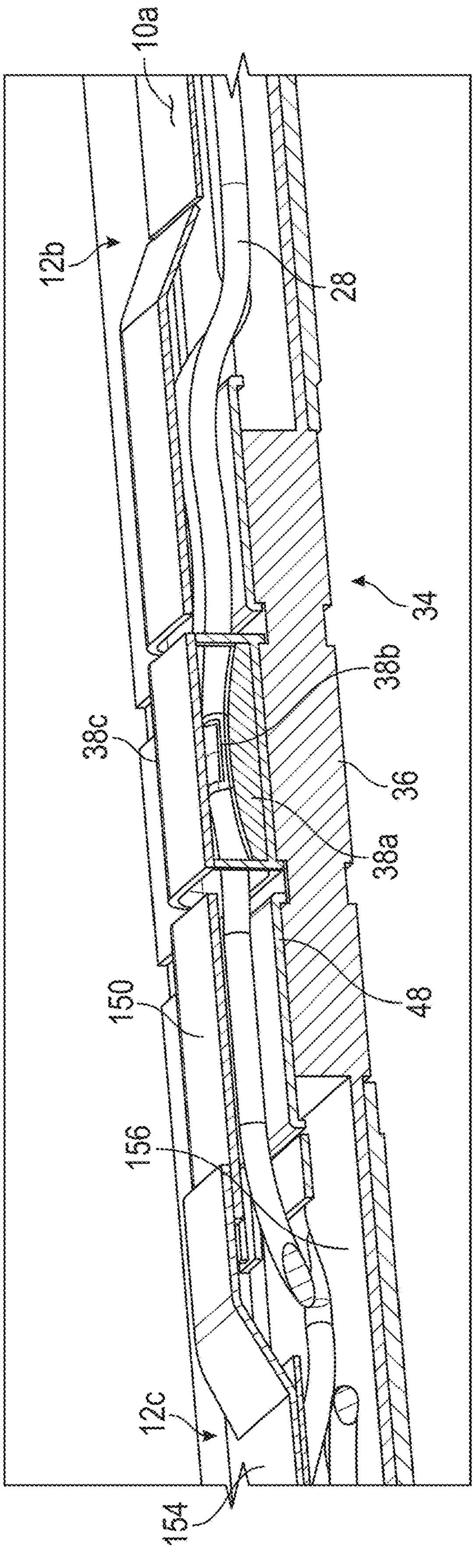
FIG. 19 is a sectional view of a portion of the tonneau cover seen in FIGS. 17 and 18.
Figure 20:
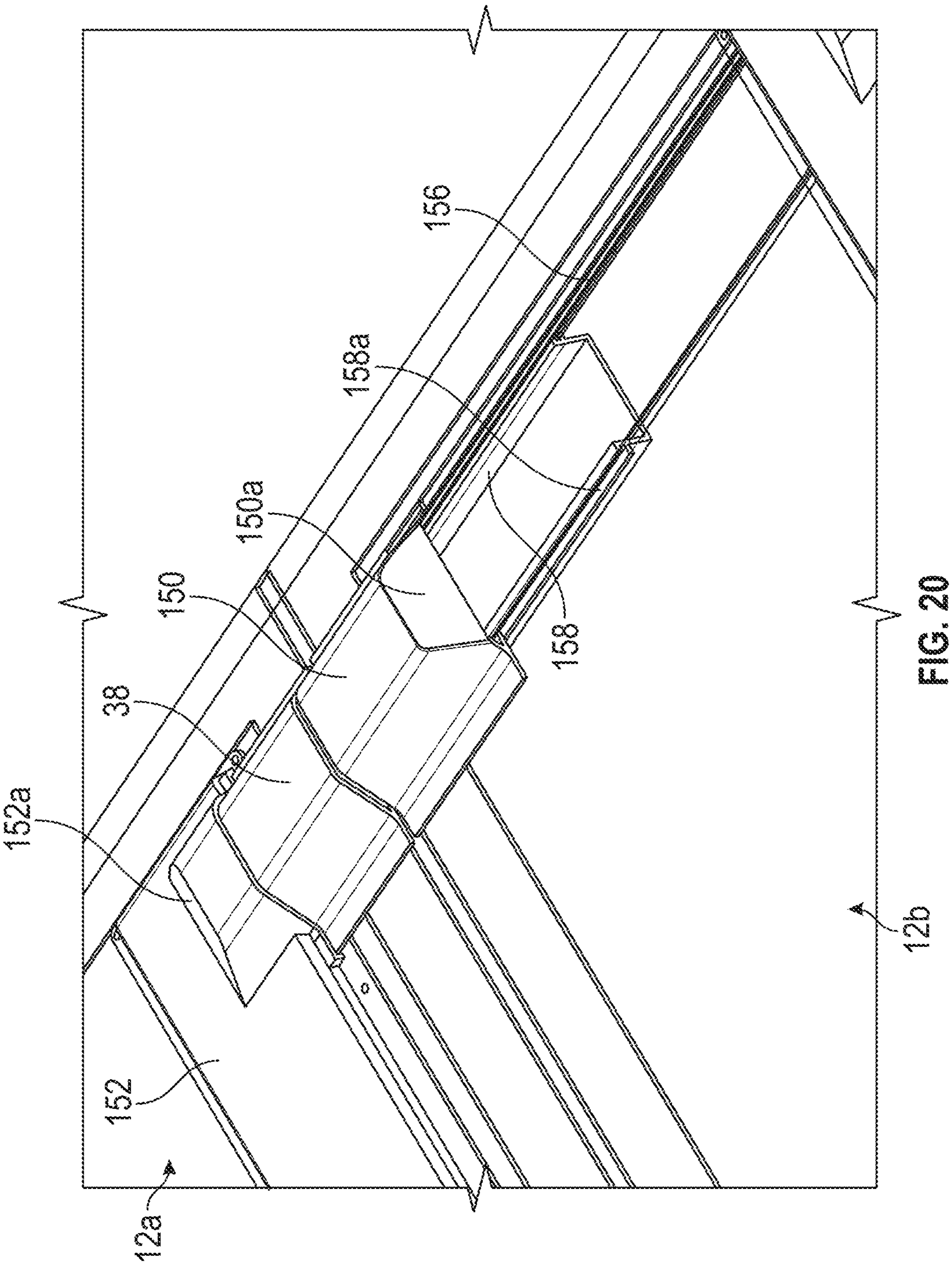
FIG. 20 is an enlarged view of a portion of the tonneau cover of FIGS. 17 and 18, showing the channel provided within the panel of the tonneau cover.
Figure 21:
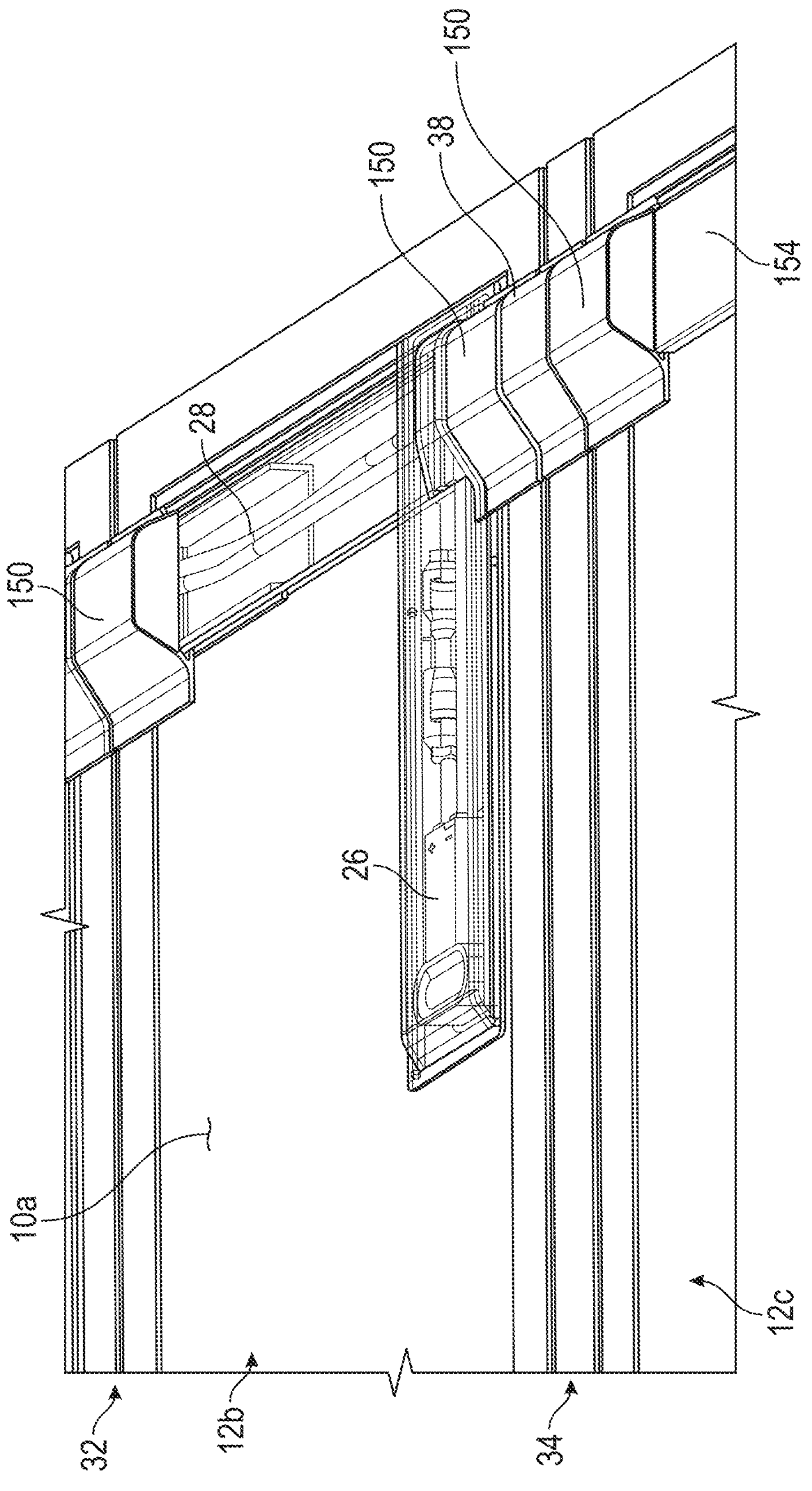
FIG. 21 is an enlarged view of the tonneau cover of FIGS. 17 and 18, showing the electrical cables disposed in the channel.
Figure 22:
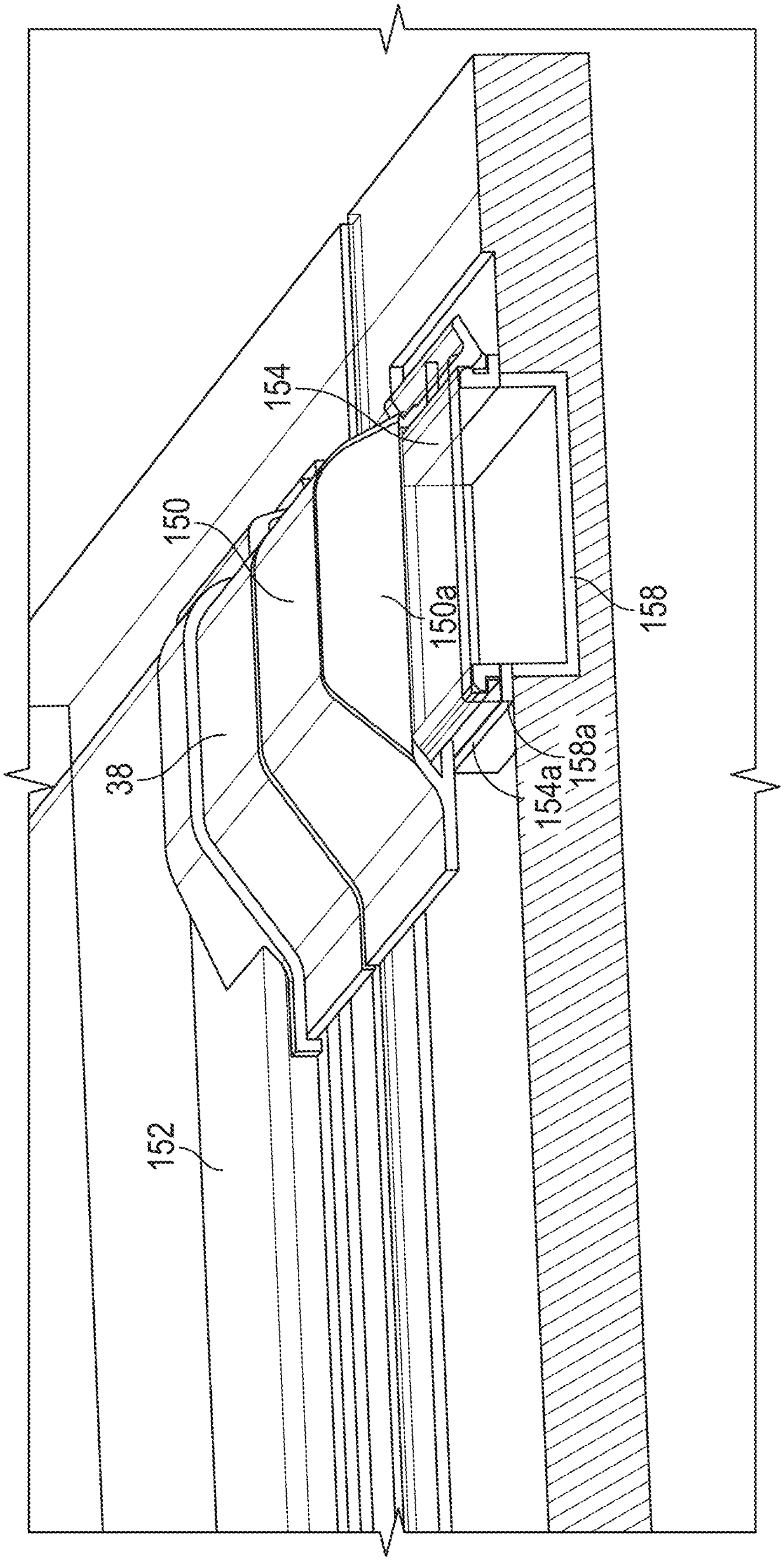
FIG. 22 is a sectional view of the tonneau cover of FIGS. 17 and 18, showing the recessed channel in the bottom surface of the tonneau cover.
Figure 23:
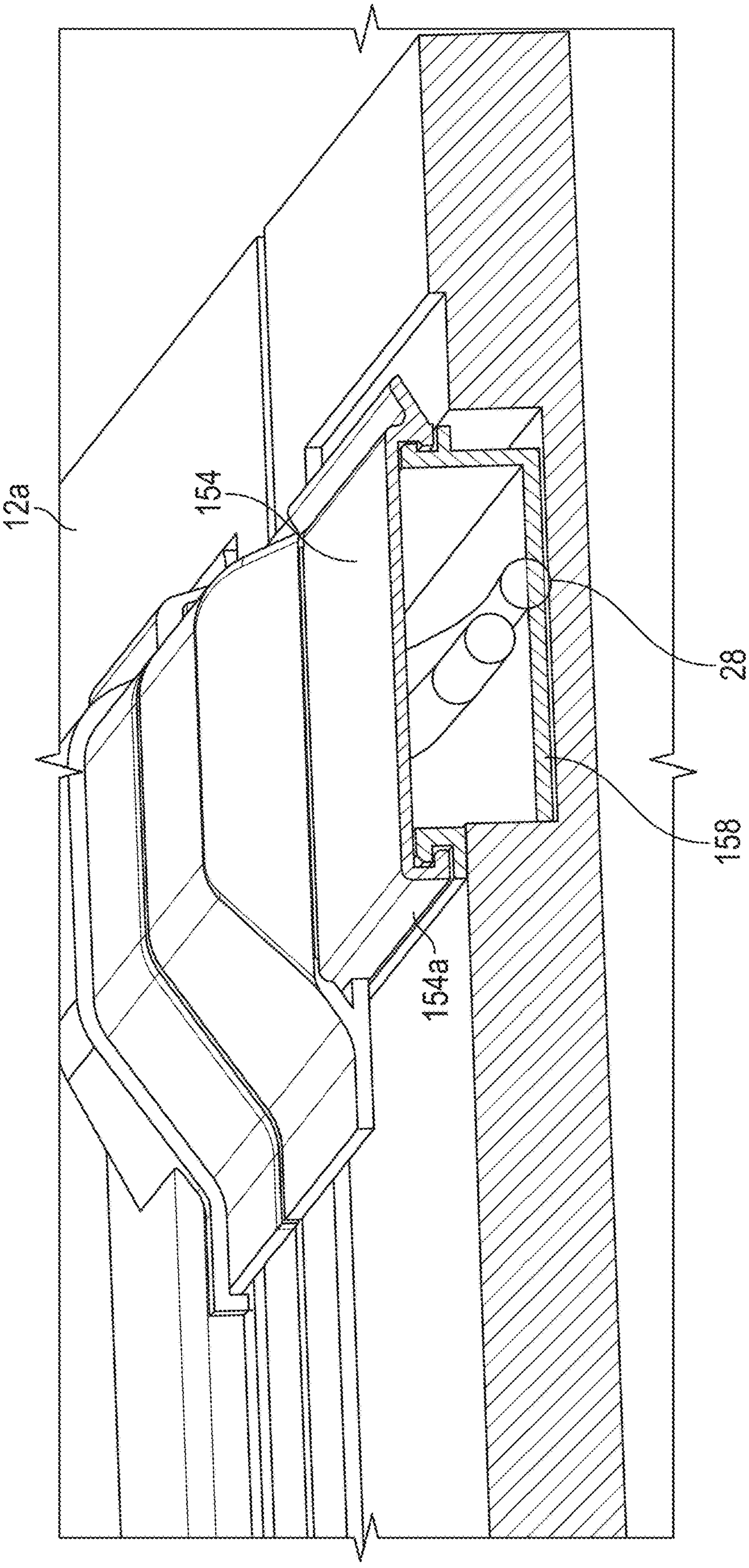
FIG. 23 is a sectional view, similar to FIG. 22, of the tonneau cover of FIGS. 17 and 18, with the electrical cables being illustrated in the channel.

FIG. 19 is an inverted depiction, in sectional view, of the tonneau cover 10 at the interface between the bulkhead panel 12*c* and the middle panel 12*b* with the double hinge mechanism 34 pivotally connecting the panels 12*b*, 12*c* to one another. As shown, the cables 28 traverse the interface and are retained at the spacer 36 against and along the curved base plate 38*a* by the clamping portion 38*b* of the wire clamp 38. Thus, when the panels 12*b*, 12*c* are folded relative to one another, the cables 28 draw up slack 55 and move within the channels 156 of the bulkhead panel 12*c* and/or the middle panel 12*b*, while maintaining their curved (i.e., not pinched), non-stressed shape at the wire clamp 38.

FIGS. 20-23 illustrate the recessed channels 156 formed in the panels 12 of the tonneau cover 10 and which further include troughs 158 that define the passageways for the cables 28 within the panels 12. The troughs 158 may include outwardly facing flanges 158*a* provided at lateral side surfaces of the trough 158. The flanges 158*a* may protrude or extend above the surface 12*a* of the panel 12 allowing them to receive corresponding rails 154*a* of the cover 154 in a snap or sliding attachment. As shown, the end portion of cover 154 over the trough 158 may be received within the cover 150 located over the slide plate 48 and/or the cover 152 located over the junction box 26 so as to provide continuous coverage of the cables 28. The covers 150, 152 may similarly have structures that engage the flanges 158*a* of the trough 158 to slidably or snap attach the covers 150, 152 to the tonneau cover 10.

As detailed herein, the cable management system 30 provides a system for the tonneau cover 10 that allows electrical cables 28 to traverse the interfaces between the foldable panels 12 of the tonneau cover 10 in a manner that prevents the cables 28 from being pinched, twisted, kinked, stretched or otherwise damaged during folding of the tonneau cover panels 12 relative to one another. The cable management system 30 may additionally retain the cables 28 along the bottom or undersurface of the tonneau cover behind covers or caps 50, 52, 54 and optionally within channels of the tonneau cover so as to prevent the cables 28 from hanging down into the bed of the truck, thereby protecting the cables from entanglement with cargo in the bed of the truck and environmental factors. Additionally, cables 28 may be more easily serviced because of the removable covers.

Although the invention has been described with reference to certain specific embodiments incorporating the principles of the invention. One skilled in the art will readily appreciate that the invention is susceptible to modification, variation and change without departing from the true spirit and fair scope of the invention, as defined in the claims that follow. The scope of the claims should therefore not be limited by the preferred embodiments, but should be given the broadest interpretation consistent with the description as a whole. The terminology used herein is therefore intended to be understood in the nature of words of description and not words of limitation.

We claim:

1. A foldable panel assembly comprising:

a first panel;

a second panel, the second panel being located adjacent to the first panel and being rotatably attached to the first panel along an interface therebetween for rotational movement about an axis of rotation, such that the foldable panel assembly has an extended position and a folded position, the folded position being the first panel rotated to stack onto the second panel;

a wire management system, the wire management system including:

a junction box disposed with the first panel and having an electrical connector, an electrical wire, the electrical wire being attached to the electrical connector of the junction box and extending from the junction box over the interface and to the second panel, wherein:

in the extended position, the electrical wire has an amount of slack sufficient to allow the electrical wire to move relative to one of the first and second panels, in the folded position, the amount of slack in the electrical wire is reduced relative to the extended position and the electrical wire is taut over the interface relative to the extended position, whereby the first and second panels may be folded onto one another and unfolded relative to one another without pinching or straining of the electrical wire during said folding and unfolding.

2. The panel assembly according to claim 1, wherein the electrical wire is retained adjacent to the first and second panels for movement along the first and/or second panel.

3. The panel assembly according to claim 1, wherein the electrical wire is retained along an exterior surface of the first and second panels for movement along the exterior surface.

4. The panel assembly according to claim 1, wherein the electrical wire is retained within a channel provided in the first panel and/or the second panel for movement within the channel.

5. The panel assembly according to claim 1, wherein a portion of the electrical wire is fixedly retained.

6. The panel assembly according to claim 1, wherein the electrical wire is fixedly retained to one of the first and second panels and moveable relative to the of the first and second panels.

7. The panel assembly according to claim 1, wherein the electrical wire is fixedly retained adjacent to the interface between the first and second panels.

8. The panel assembly according to claim 1, wherein the electrical wire is fixedly retained to a hinge mechanism provided between the first and second panel.

9. The panel assembly according to claim 8, wherein the hinge mechanism is a double hinge mechanism having a spacer between the first and second panels, the electrical wire being fixedly retained to the spacer.

10. The panel assembly according to claim 1, wherein the electrical wire extends from the junction box in a direction generally parallel to the rotational axis and extends over the interface between the first and second panels in a direction substantially perpendicular to the rotational axis.

11. The panel assembly according to claim 10, wherein the electrical wire defines a first radius of curvature when the panel assembly cover is in the folded position and defines a second radius of curvature when the panel assembly cover is in the extended position, the second radius of curvature being different from the first radius of curvature.

12. The panel assembly cover according to claim 11, wherein the second radius of curvature is smaller than the first radius of curvature.

13. The panel assembly according to claim 1, further comprising a cover provided over the junction box, the electrical wire, or both.

14. The panel assembly according to claim 13, further comprising a channel defined within at least one of the first and second panels for movement within the channel, the electrical wire being retained within the channel and the cover extending over the channel and the electrical wire.

15. The panel assembly according to claim 1, wherein the panel assembly is incorporated into a tonneau cover configured to extend over a bed of a pickup truck and is moveable between the folded position and the extended position.

16. The panel assembly according to claim 15, wherein an end of the electrical wire opposite from the attachment to the electrical connector is electrically connected to an electrical component.

17. The panel assembly according to claim 16, wherein the electrical component is a solar panel disposed on or along an exposed surface of the tonneau cover.

18. A method of manufacturing the tonneau cover of claim 15, comprising the steps of:

securing the junction box to a surface of the tonneau cover;

connecting the electrical wire to the junction box via the electrical connector;

retaining the electrical wire on the surface of the tonneau cover with the amount of slack sufficient to allow the electrical wire to move relative to one of the first and second panels of the tonneau cover.

19. The panel assembly according to claim 1, further comprising a clamp to secure the electrical wire against an exterior surface of the first and/or second panel.

20. The panel assembly according to claim 19, wherein the clamp comprises a base plate and a clamping portion disposed in overlying relation to the base plate, wherein the base plate and clamping portion define a channel through which the electrical wire is positioned.

* * * * *